United States Patent [19]
Struhsaker et al.

[11] Patent Number: 6,115,370
[45] Date of Patent: Sep. 5, 2000

[54] METHOD AND SYSTEM FOR PROTOCOLS FOR PROVIDING VOICE, DATA, AND MULTIMEDIA SERVICES IN A WIRELESS LOCAL LOOP SYSTEM

[75] Inventors: Paul F. Struhsaker, Plano, Tex.; Patrick Wilton Quinn, Fremont; Michael J. Easson, San Francisco, both of Calif.; Thomas C. Hudson, Allen, Tex.

[73] Assignee: Nera Wireless Broadband Access AS, Asker, Norway

[21] Appl. No.: 09/085,264

[22] Filed: May 26, 1998

[51] Int. Cl.$^7$ .................................................. H04J 13/02
[52] U.S. Cl. ........................................... 370/342; 370/350
[58] Field of Search .................................... 370/350, 342, 370/503, 516; 375/354, 356, 365, 368

[56] References Cited

U.S. PATENT DOCUMENTS

| | | |
|---|---|---|
| 5,166,925 | 11/1992 | Ward ......................................... 370/250 |
| 5,239,673 | 8/1993 | Natarajan . |
| 5,267,244 | 11/1993 | Messerschmitt et al. ............... 370/281 |
| 5,428,647 | 6/1995 | Rasky et al. ............................. 370/350 |
| 5,504,773 | 4/1996 | Padovani et al. . |
| 5,511,067 | 4/1996 | Miller . |
| 5,511,073 | 4/1996 | Padovani et al. . |
| 5,544,223 | 8/1996 | Robbins et al. ......................... 455/426 |
| 5,555,258 | 9/1996 | Snelling et al. . |
| 5,566,172 | 10/1996 | Mourot ..................................... 370/476 |
| 5,603,095 | 2/1997 | Uola . |
| 5,638,362 | 6/1997 | Doshi et al. ............................. 370/350 |
| 5,689,502 | 11/1997 | Scott ........................................ 370/281 |
| 5,689,511 | 11/1997 | Shimazaki et al. . |
| 5,732,076 | 3/1998 | Ketseoglou et al. ..................... 370/281 |
| 5,754,555 | 5/1998 | Hurme et al. ............................ 370/522 |
| 5,781,856 | 7/1998 | Jacobs et al. ............................ 455/403 |
| 5,802,177 | 9/1998 | Daniel et al. ............................ 455/403 |
| 5,812,651 | 8/1998 | Kaplan ..................................... 379/200 |
| 5,821,987 | 10/1998 | Larson ................................. 379/93.17 |
| 5,898,665 | 4/1999 | Sawahashi et al. ..................... 370/350 |
| 5,910,945 | 6/1999 | Garrison et al. ........................ 370/324 |
| 5,933,421 | 8/1999 | Alamouti et al. ....................... 370/281 |
| 5,953,675 | 9/1999 | Rabina et al. ........................... 455/557 |

OTHER PUBLICATIONS

Cook, 1994, "Development of Air Interface Standards for PCS," *IEEE Personal Communications Fourth Quarter*:30–34.

Rappaport, *Wireless Communications: Principles and Practice* Prentice Hall PTR, New Jersey, 1996, pp. 395–482.

Tanenbaum, *Computer News*, Third Edition. Prentice Hall PTR, New Jersey, pp. 479–576.

Yu et al., 1997, "Low–Tier Wireless Local Loop Radio Systems—Part 1: Introduction," *IEEE Communications Magazine March 1997*:84–91.

Yu et al., 1997, "Low–Tier Wireless Local Loop Radio Systems—Part 2: Comparison of Systems," *Communications Magazine March 1997*:94–98.

*Primary Examiner*—Min Jung
*Attorney, Agent, or Firm*—Long Aldridge & Norman LLP; Steven B. Kelber

[57] ABSTRACT

A method and system for implementing various protocols for a Time Division Duplex (TDD) Code Division Multiple Access (CDMA) wireless local loop system that utilizes unique embedded concentrated access and embedded data access in a Wireless Local Loop (WLL) is described. The method and system further provides for dynamic pool sizing of the access channels. The protocols support POTS (Plain Old Telephone), ISDN, and direct data service in a point to multi-point configuration. The protocols are inherently flexible so as to provide Enhanced Bandwidth and quality of service (QOS) via CDMA. Channel concatenation (multi-code modulation) provides a multiplicity of channels. The system utilizes frequency division duplex (FDD) operation so as to double capacity. The system further utilizes scaleable architecture for bandwidth expansion and higher data rate services.

36 Claims, 18 Drawing Sheets

METHOD AND SYSTEM FOR PROTOCOLS FOR PROVIDING VOICE, DATA, AND MULTIMEDIA SERVICES IN A WIRELESS LOCAL LOOP SYSTEM

CROSS REFERENCE TO RELATED APPLICATIONS

This application is related to application Ser. No. 09/085,263, entitled Method and System for an Air Interface for Providing Voice, Data, and Multimedia Services in a Wireless Local Loop System, filed concurrently herewith, now pending, and to application Ser. No. 09/085,262, entitled Method and System for a Micro Channel Bank for Providing Voice, Data, and Multimedia Services in a Wireless Local Loop System, also filed concurrently herewith, now pending. Each of these applications is incorporated herein by reference.

FIELD OF THE INVENTION

The present invention relates to the implementation of wireless systems in a local telephone loop environment in what is usually called a Wireless Local Loop (WLL). The present invention particularly addresses the air interface and protocols used in the implementation of a Wireless Local Loop.

BACKGROUND OF THE INVENTION

The local loop of a telephone system is what some have termed the "last mile" or the "last 1000 feet". This local loop is essentially the copper wire that connects the customer premises (ie, a house or business) to the telecommunications network. The cost of laying down the copper wire can be very expensive (ie, over $1 per foot). Where communities are rural in nature as in some parts of the United States or in developing countries, laying down such an infrastructure can be prohibitively expensive.

As an alternative to installing a wire or cable infrastructure, these rural communities are turning to wireless solutions for their telecommunication needs. However, conventional wireless telecommunication technologies suffer from a number of disadvantages. Often times, because of the quality of the service, modem connections are frequently difficult to establish and maintain. Even where modem connections are possible, data rates are often prohibitively slow.

A further disadvantage of conventional wireless telecommunication technologies relate to their inefficient use of their RF spectrum resources. Subscribers transferring data over the network occupy channels that would otherwise be available for voice communication. In instances in which many subscribers are, for example, accessing the internet, these conventional wireless technologies suffer from a serious degradation in Grade of Service (GOS) resulting in an increase in the percentage of calls blocked (i.e., Erlang B).

These deficiencies are particularly troublesome in view of the fact that data usage is bursty in nature. Analysis of internet data usage indicates that approximately 95–97% of the time, the data network is idle. Furthermore, the aggregate throughput to a user is typically less than 5 kilobits per second.

Therefore, there is a need for a wireless telecommunication system to replace the local loop which more efficiently allocates resources between voice and data communications yet maintains a desirable high GOS.

The following U.S. Patents are made of record for teaching various aspects of wireless telecommunications.

In U.S. Pat. No. 5,239,673, issued Aug. 24, 1993, entitled "Scheduling methods for efficient frequency reuse in a multi-cell wireless network served by a wired local area network," Natarajan describes communication methodologies that realize an efficient scheduling and frequency reuse in a wireless communications network that is served in a wired network.

In U.S. Pat. No. 4,639,914, issued Jan. 27, 1987, entitled "Wireless PBX/LAN system with Optimum Combining," Winters discloses a wireless LAN system that employs adaptive signal processing to dynamically reassign a user from one channel to another.

In U.S. Pat. No. 4,837,858, issued Jun. 6, 1989, entitled "Subscriber Unit for a Trunked Voice/Data Communication System," Ablay et al. disclose a trunked voice/data subscriber that operates in either a voice mode or one of three data modes.

In U.S. Pat. No. 4,852,122, issued Jul. 25, 1989, entitled "Modem Suited for Wireless Communication Channel Use," Nelson et al. disclose a wireless communication system and, specifically, a modem that communicates digital data with data terminal equipment.

In U.S. Pat. No. 5,603,095, issued Feb. 11, 1997, entitled "Radio System and a Subscriber Terminal for a Radio System," Uola discloses a wireless local loop system having at least one exchange, at least one subscriber database and base stations, and subscriber terminals communicating with the fixed network via a radio path.

In U.S. Pat. No. 5,555,258, issued Sep. 10, 1996, entitled "Home Personal Communication System," Snelling et al. disclose a wireless, in-house telephone system designed to provide multi-line telephone operations, allowing the consumer to set up a multiple telephone, multiple line system without having to use wired phone connections running throughout the building.

In U.S. Pat. No. 5,689,511, issued Nov. 18, 1997, entitled "Data Receiver for Receiving Code Signals Having a Variable Data Rate," Shimazaki et al. disclose a data receiver capable of identifying the code rate of received data and decoding the data at an adequate rate without resorting to a data buffer or a plurality of decoding circuits.

In U.S. Pat. No. 5,504,773, issued Apr. 2, 1996, entitled "Method and Apparatus for the Formatting of Data for Transmission," Padovani et al. describe a data format which facilitates the communication of various types of data, and data of various rates, to be communicated in a structured form.

In U.S. Pat. No. 5,511,067, issued Apr. 23, 1996, entitled "Layered Channel Element in a Base Station Modem for a CDMA Cellular Communication System," Miller describes a layered channel software element which supervises the operation of channel element modem resources in a CDMA cellular telephone system that includes forward channels for conveying message and signalling data from a CDMA system base station to mobile units and reverse channels for conveying message and signalling data from mobile units to base stations.

Wireless local area networks (WLAN) have been available for connecting various computers in a local area. However, such systems have not been appropriate for application on the scale of a local loop. The method of transmitting and receiving signals in WLAN's is not appropriate for the large distances and varied weather conditions encountered in a local loop scenario. Wireless local area networks have the further disadvantage that they cannot carry voice information appropriate for a telephone system.

SUMMARY OF THE INVENTION

It is an object of the invention to provide a wireless telecommunication system that allows individual subscribers in an area of service seamless telecommunications access (i.e., POTS (plain old telephone system), ISDN (Integrated Services Digital Network), data, multimedia, etc.) to a telecommunications network. This system facilitates full voice, data, and fax utilization. This system is designed to replace existing local loops or provide infrastructure for those communities with no local loop is in place which.

These and other objects are achieved by a wireless local loop (WLL) comprising a first interface connecting the WLL to the telecommunications network, a second interface connecting the WLL to a plurality of customer premise equipment (CPE) such as telephones, faxes, and computers, and point to multi-point radio frequency (RF) communications channels connecting the first interface to the second interface. The multi-point RF communication channels provide the user with traffic/bearer data, user control data and radio link specific overhead and control. Traffic bearer data may include the users encoded voice or data signal. User control data may include ISDN (Integrated Services Digital Controller) D-channel, translated CAS (Channel Associated Signaling) or OAM&P (Operations, Administration, Maintenance & Performance). Radio link overhead and control may include power settings, timing and framing. The present invention makes improvements to the WLL system while not requiring substantial changes to the telecommunications network or the customer premise interface (CPI).

It is a further object of the present invention to provide concentrated access to the telecommunications network to buildings, campuses, or similar organizations in the area of service that are expected to have high telecommunications traffic demand. This and other objects of the invention are achieved by a capability referred to as "embedded concentrated access" which allows the removal of a specified number of channels from the pool of multi-point RF communication channels and assigns them to the high traffic demand structure. These removed channels are referred to as the "micro-channel bank." The micro-channel bank provides the high traffic demand structure with traffic/bearer data, user control data and radio link specific overhead and control. The micro-channel bank is assigned to an extended radio unit (ERU) attached to or associated with the high traffic demand structure. The ERU provides traffic messaging and bearer channels to a micro-channel bank via the digital radio link (DRL). The remaining multi-point RF communication channels provide an acceptable grade of service (GOS) to the other subscribers in the area of service.

It is a further object of the present invention to provide for dynamic pool sizing of the various channels in the WLL. As the usage conditions of the WLL change, the size of the various pools of channels can be dynamically changed to meet the differing conditions. Such dynamic pool sizing can be used upon system initialization to get all the subscriber units on the system operational as quickly as possible. Dynamic pool sizing can also be used to improve overall system performance during adverse weather conditions so as to increase the processing gain of the system.

It is a further object of the present invention to provide the subscriber with a fast and efficient wireless data interface. This and other objects of the present invention are achieved by a capability referred to as "embedded data access." The present invention advantageously uses subscriber usage statistics (data usage is idle approximately 97% of the time) to allow a large group of subscribers shared access to a smaller pool of RF traffic channels. The system performs at a grade of service (typically 1% in the United States) related to percentage of calls blocked (i.e. Erlang B). The management of N subscribers in a smaller pool on M available channels is called "concentration" or "trunking" with a concentration ratio of N/M>1. Concentration is one further aspect of the present invention.

Through the use of an interface at the subscriber premises, a direct data access protocol can be utilized to provide the subscriber with a fast and efficient wireless data interface. Such an interface would not use consumer-type modems to achieve such data communications. This would eliminate the requirement that each user be assigned one particular channel. Rather, several data users could use one data channel while still achieving similar or better performance as compared to a high-speed modem.

BRIEF DESCRIPTION OF THE DRAWINGS

These and other features, aspects and advantages of the present invention are better understood with reference to the following description, appended claims and drawings where:

DETAILED DESCRIPTION OF THE PREFERRED EMBODIMENT

The following is a description of the wireless local loop (WLL) system of the present invention. The numerical examples provided are provided as examples and are not meant to limit the scope of the invention.

Figure 1:
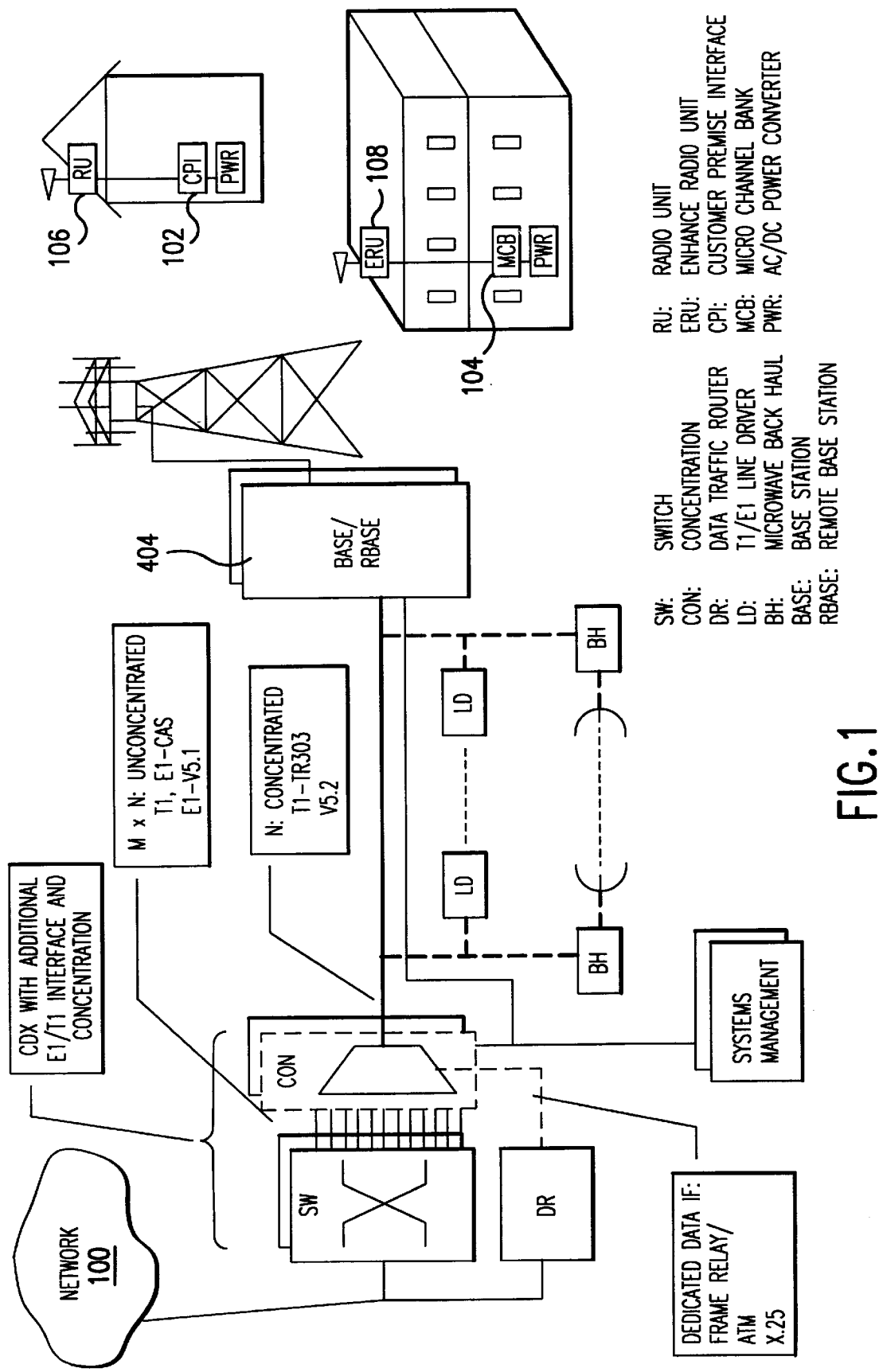
FIG. 1 is a diagram of the different components of a WLL system according to the present invention.

FIG. 1 shows the different components of a WLL system. The WLL system replaces and/or supplements the copper wire local loop of a typical telephone system. In FIG. 1, the WLL is essentially bounded by the network interface 100 and the customer premise interface 102 for single subscribers or the network 100 and the micro-channel bank (MCB) 104 for a pooled channel system. The various items in between, thus constitute the WLL system. The improvements of the present invention deal in particular with the interface between the basestation 404 and the radio unit (RU) 106 or the extended radio unit (ERU) 108.

Figure 2:
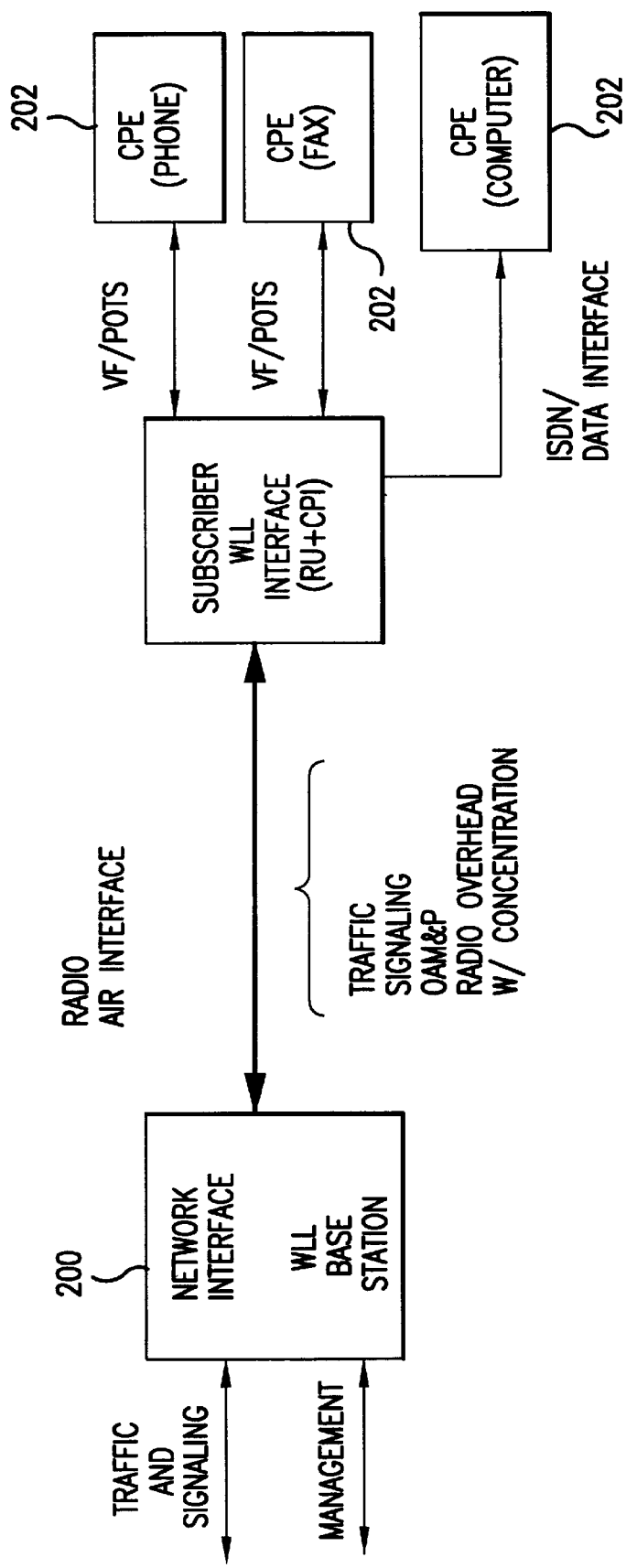
FIG. 2 is a simplified diagram of WLL with respect to a single subscriber according to the present invention.

FIG. 2 provides a simplified diagram of a WLL interface with respect to a single user where the WLL system is bounded by the network interface 200 and the customer premise interface 202. By allowing for various individual users that communicate with a single base station 202, the WLL thus provides point to multi-point RF wireless communications.

The following describes various considerations and improvements for the implementation of a wireless local loop system.

Frequency Planning: Co-Channel Interference

The capacity of a cellular wireless system (i.e. the number and density of users that can be serviced) is heavily influenced by the cell channel frequency reuse plan, use of sectored antennas, and the minimum signal to interference ratio (SIR) of the RF modulation. Co-channel interference (CCI) from adjacent cells represents a fundamental issue in system design and deployment.

In general, deployment of a WLL system with a maximally efficient frequency and cell plan is desired thus allowing system deployment with minimal spectral occupancy. Additional capacity can be gained by "stacking" additional channel groups (clusters) to increase frequency use and capacity by two, three or more times. While it is possible to deploy a system with a frequency reuse of one (i.e. all cells use the same frequency) in a CDMA system, the CDMA channel capacity must be reduced so that excess processing gain is available to combat the co-channel interference.

Cell reuse factors, N, of three and seven are the smallest possible while 12, 13, and 19 are unreasonably large. The use of sectored antennas can further improve performance by limiting the number of adjacent cells that project power directly into the receiver. For a reuse factor of three, 120 degrees sectors can be used. For a cell reuse factor of seven, both 120 and 60 degree sectors can be used.

The following table summarizes the performance of 3 frequency/1 sector and a 3 frequency/3 sector frequency reuse plans where n in the table equals the RF path loss. Note that an SIR of 13 dB is required for a bit error rate (BER) of $10^{-5}$ with DQPSK modulation, for almost any deployment where ideal propagation exists (i.e., N=2). Forward error correction is required for this purpose. Frequency reuse of three without sector antennas is generally not viable. The most spectrum efficient cell plan would be the deployment of three channels with three 120 degree sectors. Proper planning and installation of the basestation antenna (minor tilt down) can ensure that the RF path loss is greater than or equal to 2.7 (ie, 10 dB SIR).

| Frequency/Sector | SIR for n = 4 | SIR for n = 3 | SIR not n = 2 |
|---|---|---|---|
| 3/1 | 11.3 dB | 6.5 dB | 1.7 dB |
| 3/3 | 16.1 dB | 11.3 dB | 6.5 dB |

A great advantage of a DSSS CDMA systems is the ability to reduce the number of active CDMA traffic channels to maintain a minimum bit error rate quality of service at the expense of higher blocking probabilities. In this manner while the number of channels available to subscribers is reduced, because of the increase in processing gain, the quality of the remaining channels is increased thus reducing the bit error rate (BER). BER and signal quality measurements at the base station are used to manage the available traffic pool and make changes when appropriate.

Adjacent Channel Interference

Another consideration in implementing the present wireless local loop system is adjacent channel interference (ACI). ACI is the result of active transmitters that lie outside of the occupied frequency band. The source of ACI is either the WLL system's own cellular reuse frequency channels or active signals from other systems.

ACI can be minimized by careful filtering (at both the transmitter and receiver) and by appropriate channel assignment within the WLL service area. In the ISM (Industrial Scientific and Medical) band, adjacent unlicensed users are always present. A strategy of filtering in depth, using digital base band pulse shaping combined with SAW IF filtering, can provide between 60 and 70 dB of Adjacent Channel Rejection (ACR). Raised cosine (RC) finite impulse response (FIR) filters and half-band filters have been found appropriate where the choice depends on particular regulatory requirements and system specifications such as frequency cutoffs and bandwidth.

System Capacity and Grade of Service (GOS)

The grade of service (GOS) is a measure of the ability of a user to access a concentrated system during the busiest hour based on customer demands. In the United states and other developed countries during the busiest hours, the traffic intensity of a home user is approximately 0.07 Erlang (4.2 minutes per hour which is usually three to four short calls) while a business user represents about 0.1 Erlang. The GOS is generally based on a percentage of calls blocked or Erlang B.

In a system with 24 traffic channels (typical for the present implementation of a TDD CDMA), the following table provides the number of users that can be supported with 1% and 2% GOS given 0.07 Erlang of traffic intensity at the peak usage time. Numbers are provide for a single sector. Note that in the ISM band it is possible to support 22 channels or 7 clusters with 3 frequencies per cluster. Although the ISM band is mentioned here, the present invention is not limited to the ISM band.

| Cluster/Sectors/Channels | Users at 1% GOS | Users at 2% GOS |
|---|---|---|
| 1/1/24 | 218 | 237 |
| 1/3/72 | 655 | 711 |

A typical user in the United States tolerates a 1% GOS but not much worse. However, users in developing nations may tolerate 2% or even up to 5% GOS meaning that a WLL system as described herein could support many more users in developing nations. Furthermore, while many more users are being supported, the voice and data quality is not compromised. In this manner, a developing community may be able to implement the infrastructure for a high quality telephone and data system to serve a large number of sparsely distributed customers at a very low cost. Clearly, all these are desirable qualities.

One capability beyond the standard channel subscriber station (single, dual channel, or single/dual channel with a data interfaces) is the concept of the Micro-Channel Bank (MCB). The MCB uses between 1 to M CDMA channels where M is typically between 3 and 8. When these channels are in use by the MCB, they are removed from the overall CDMA channel pool and results in reduced concentration efficiency or a lower GOS for the individual subscribers. For the MCB concept to be effective and to reduce cost, the concentration efficiency in the limited pool of M channels must be relatively close to that of the system as a whole. To achieve this goal, the architecture of the MCB and associated interfaces must provide for dynamic addition of CDMA channels based on subscriber demand. Channels are not "nailed up" or fixed to a particular service and are, therefore, available as usage demands change. Furthermore, increased voice compression can be utilized to increase the number of channels and, hence, the concentration efficiency. With such voice compression, the data rate can be reduced from 32 Kbps to 16 Kbps to increase the concentration efficiency at the cost of reduced voice quality. Furthermore, not only could every subscriber be aggregated to voice channels, but the subscribers could also be aggregated to data channels so as to provide an embedded virtual local area network.

While the discussion thus far has concentrated on voice service as an implementation of the present invention, the reader is reminded that the present invention also allows for excellent data service on the same system at the same time.

Without modification to the voice service implementation described above, a user desiring data service may use a high speed modem. Because a modem uses modulation techniques that implement frequencies in the voice range, such a modem would work satisfactorily using the voice service. While such an implementation would function adequately, there is much waste that is undesirable. Typically, internet use results in 97% idle time with short periods of high transfer rates where the average data transfer rate is approximately 5 kilobits per second. Such a scenario results when a user accesses a web site with various graphics, text or sound which are downloaded upon access of the web site. At this point, high transfer rates are experience. Once the needed information is downloaded to the user's computer, there can be large periods of idle time where the user may be reading or observing the web site. During the idle time, there is typically very little, if any, data transferred. However, during this time when a modem is used, an entire channel is removed from service for large periods at a time typically measured in hours not minutes as compared to regular voice service. Data service in this manner thus greatly increases the Erlangs per subscriber. In a WLL implementation where CDMA channels are a limited resource, a data implementation using a typical modem is highly undesirable.

By way of example only and not to limit the scope of the present invention, allowing 4 to 6 users to sequentially access one CDMA data channel instead of those 4 to 6 users removing 4 to 6 CDMA channels for extended periods of time, concentration efficiency is increased. The removal of 4 to 6 users using modems removes 17% to 25% of the available channels (assuming 24 available channels) while the data implementation of the present invention allows for 4 to 6 users to remove only 4% of the channels (1 channel out of 24 typical channels). A properly designed WLL system as described herein can provide a direct data interface to the subscriber and to the network and retain an adequate concentration efficiency. In effect, the present invention allows for the unique and beneficial implementation of a local area network (LAN) on a system that simultaneously provides full-featured voice service.

In implementing a LAN on a WLL system, there are various considerations to resolve including media access control (MAC) protocol options. Where the LAN concept involves various users sharing a physical link (ie, wired, fiber optic, or wireless), there needs to be a proper implementation of a MAC protocol access algorithm that allows for: packet access; collision avoidance and collision detection; error detection and data retransmission; and, flow control/backoff/holdoff to maintain stability. Furthermore, because the packet structure of a WLL system is not optimized for the typically long LAN packets, a method must be implemented that provides for fragmentation of LAN packets into packets appropriate for a WLL system. The fragmented packets can then be encapsulated with appropriate MAC data information including: packet length; ACK/NACK; a virtual or short interval address corresponding to a physical address; Cyclic Redundancy Code (CRC); and, Flow Control.

An implementation of a LAN on a WLL system involves uncoordinated users competing for the use of a shared channel. The WLL introduces problems that eliminate the use of certain multiple access protocols. In particular, neither pure ALOHA nor slotted ALOHA is particularly well suited because multiple user contentions for a single channel would cause high amounts of access noise, thus reducing the performance of the whole system. However, a polled or token ring system in which the various users take turns sending data is appropriate for the LAN of the present invention. Such an implementation is very stable where every user is provided with a fixed time slot in which the user is allowed access to the data channel. As an extension of the token ring protocol, a demand access or reservation protocol may also be implemented that would provide further options to the LAN. Demand access and reservation allows for maximum and efficient use of the available bandwidth. The added complexity in the MAC algorithm is balanced by its many benefits including its stability under all conditions.

In providing data service, the present invention requires the use of a dedicated data interface at the customer premises where such a data interface functions much as a regular telephone interface. The present invention further uses a modified CDMA channel to more efficiently transfer data at a high rate. The network interface as shown in FIG. 1 would thus also provide for a network data interface. The customer is provided with specially modified software that negotiates the Internet Protocol addresses with "virtual" addresses so as to more efficiently allow sequential access to the various data users.

In implementing the LAN on the WLL of the present invention, efficiency is sought wherever possible including efficient messages and responses to the subscriber station in the subscriber gaining access to the data channel. Inefficiencies must be reduced in the turn around gap where the subscriber is sent a message requiring a response as to whether the subscriber is to respond to a token on the next transmission. Immediate response is necessary.

Furthermore, alignment problems must be resolved by providing control packets that are sent only at 2 ms transmissions.

The LAN must make extensive use of media access control (MAC) packets to make more effective use of bandwidth. As an example, ACK and tokens may be combined in a single access packet. Dynamic packet sizes are also allowed. "Frame to next slot" messages, which define the number of frames to the next slot, may be embedded in the basestation header in transmission to the subscriber station. The basestation can use the packet header to broadcast 2 ms slots and address of the next subscriber in a MAC encapsulated header. Here, the basestation has more data and longer packets to transmit to the subscriber stations and the subscriber-to-basestation messages are short. Subscriber access time is wasted in the time waiting for the basestation to complete broadcasting the token.

The present invention thus allows for the dynamic assignment of voice and data channels on an as-needed basis. Where more users require data access, more data channels may be assigned. Or, where more users desire voice service, more voice service may be assigned. Through this dynamic sizing of voice and data service, much more and better service is provided than in a situation where the channel assignments are fixed.

CDMA Implementation Issues

While no system is ideal, the present invention incorporates the various specific benefits and limitations in implementing a CDMA system.

The CDMA channel capacity is limited by self noise. For N CDMA channels, the maximum utilization is typically 75 to 85% in real-world RF conditions. Therefore, in an ideal 32 channel CDMA system only approximately 24 channels are actually available for voice or data service. In the present invention, the flexibility of CDMA is utilized to dynamically restrict the pool of traffic or data channels to combat noise. Where there may be an inappropriate amount of noise when all 32 channels are used for traffic, by reducing the channels, the self noise is reduced with an increased processing gain.

The present invention further takes advantage of processing gain in a unique manner. For voice service, it is obvious that a pair of channels is necessary—one to speak (transmit) and one to listen (receive). Because of self alignment and perfect power level of all channels at the basestation, the basestation to subscriber station link has lower self noise and thus greater capacity. Basestation to subscriber performance typically needs less, if any, processing gain as compared to subscriber to basestation transmissions. Furthermore, very low complexity broadcast access can be used by the basestation to subscriber station link with token and ACK/NACK embedded in the packet stream.

Because voice service necessarily uses pairs of CDMA channels, the same reduction in basestation-to-subscriber and subscriber-to-basestation channels is necessary so that a symmetry exists. In a data service situation, such a symmetric channel pair is not necessary. The present invention, through dynamic pool sizing, is able to optimize performance by reducing subscriber-to-basestation and basestation-to-subscriber channels independently. Because of the physics of subscriber and basestation transmissions, more basestation-to-subscriber channels can be achieved than subscriber-to-basestation channels. Asymmetrical data channel assignment is, thus, achieved.

A typical data situation occurs where a user makes requests to receive information (i.e. by clicking on a web link) that contain large amounts of text, graphics and sound. Thus, the user sends a small amount of data and receives a large amount of data—an asymmetrical situation. The asymmetrical data channel assignment is then very well suited for this type of scenario. Thus, the present invention makes use of every available channel that can be established regardless of whether it is paired with another channel.

In further considering CDMA implementations of the present invention, power control of the subscribers is related to access noise and has a large impact on system capacity. In general, TDD systems have a distinct advantage over FDD systems because receiver power measurements can be directly applied to transmitter power output with low rate minor adjustments to and from the basestation. In contrast, FDD requires full command by the basestation to the subscriber station as transmitter and receiver links are uncorrelated. Note that in the present implementation, subscriber transmitter power should be kept within +/−0.5 dB and that power control must handle fade rates of up to 25 dB/s.

TDD further allows for subscriber-only diversity antenna techniques which improve performance in a high multi-path environment. Receiver diversity measurements and diversity switching can be directly applied to the transmitter. Note that receiver power measurements must be applied to the transmitter power output. Directional antennas at both the subscriber and basestation provide significant reduction in multi-path and cell to cell AGI and CCI. Beam steering, "smart" antennas can be deployed for further system improvement.

OSI Model

Figure 3:
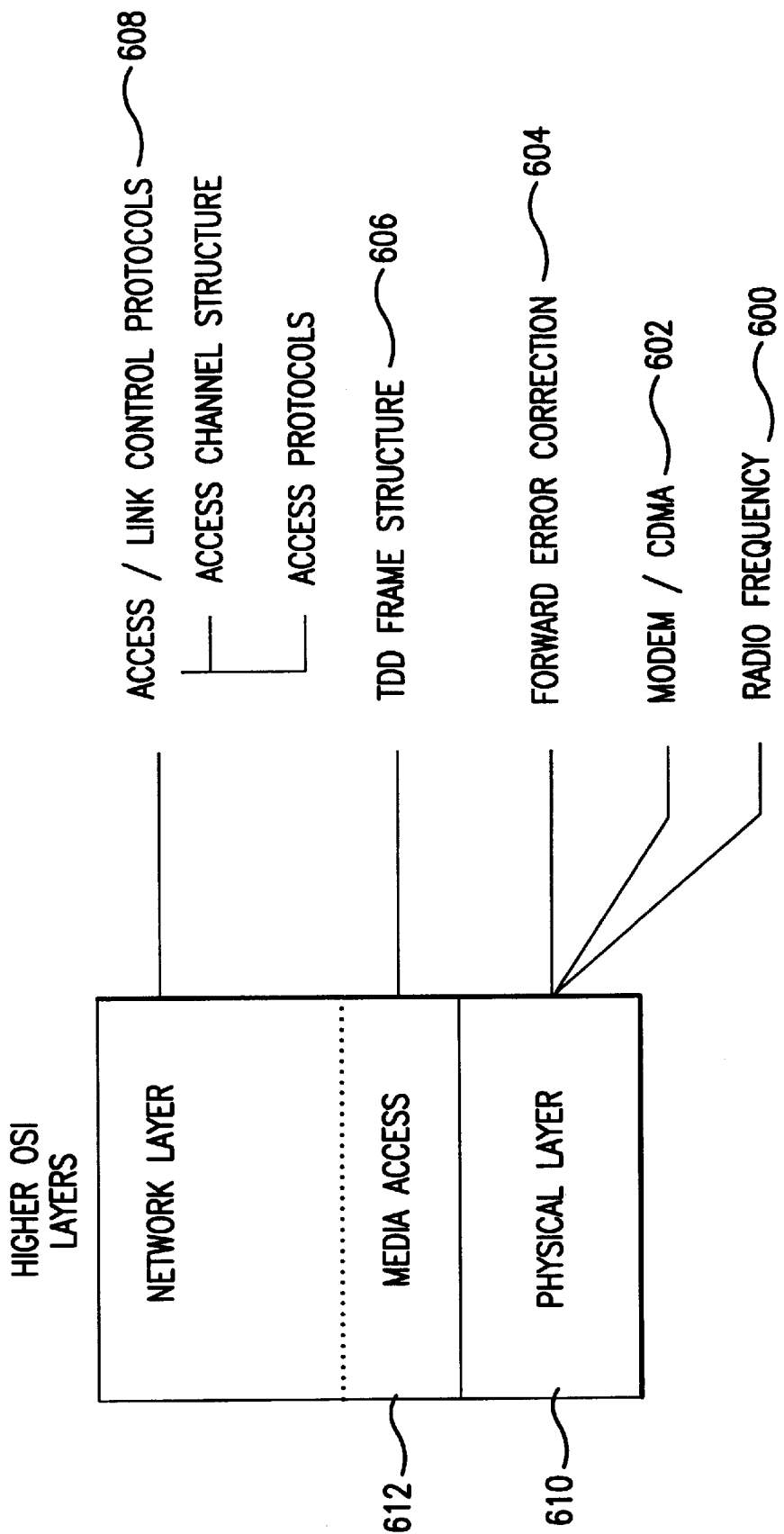
FIG. 3 is a mapping of the present invention to an OSI protocol stack.

FIG. 3 provides a mapping of the sub-sections to the OSI model. The present invention corresponds to the Physical 610 and Link 612 layers in the OSI protocol stack. The present invention can be described in a logically ascending order using this model. Radio Frequency 600 considerations are discussed first followed by Modem/CDMA 602, Forward Error Correction 604, TDD Frame Structure 606 and finally Access/Link Control Protocols 608. Where differences exist between the base to subscriber ("downlink") and the subscriber to base ("uplink") interfaces, those differences are noted.

In the sections to follow, the physical interface is discussed including the RF specifications and the packet structure. The various protocols involved in the present invention are then addressed including acquisition, call set-up, data service set-up.

Physical Layer

RF Specification

Based on customer requirements and regulatory authorization, the present invention can be deployed in various RF bands. For the present implementation, the ISM band is used as an example. The principle design issues for 1.5 to 6 GHz deployment are availability of low cost RF chipsets, and increased phase RF oscillator phase noise and PPM drift limitations.

Given the RF specifications of the present implementation, one skilled in the art understands that changes can be made to fit a particular implementation. As an example of an implementation in the ISM band, the following table provides the RF specifications as used in the present implementation. Note, however, that the present invention can be implemented in many appropriate frequency bands such as the ISM band at 2.4 GHz.

| | |
|---|---|
| TX/RS Channel Bandwidth | 3.5 MHz nominal |
| TX channel filter | Raised cosine with 32.5% excess bandwidth. 3.4 MHz with 50 kHz guard band. Minimum 50 dB out of band suppression at TX RF. |
| RX channel filter/adjacent channel interference | Composite IF/base band filter with better than 50 dB adjacent channel interference suppression at the band edge. |
| TX/RX channels | 22 channels center frequencies separated by 3.5 MHz<br>Channel 1 $F_c$ = 2.403 MHz<br>Channel 2 $F_c$ = 2.4065 MHz<br>.<br>.<br>.<br>Channel 22 $F_c$ = 2.480 MHz<br>(Note: Excess guard bank at both ends of band to meet ETSI/FCC forbidden zone emissions) |
| Compliance | FCC Part 15.247, ETSI res 10<br>(Note: Processing gain test port must be provided for compliance.)<br>Human radiation hazard per ANSIC 95.1 |
| Subscriber TX/RX power ramp | <8 CDMA chips from P0 (nominal TX power) to P0 - 20 dB |
| Basestation TX/RX power ramp | <4 CDMA chips from P0 (nominal TX power) to P0 - 20 dB |
| Subscriber Transmit power control range | 70 dB nominal, 65 dB minimum, 80 dB desired |
| Subscriber Receiver AGC Range | 70 dB nominal, 65 dB minimum, 80 dB desired |
| Basestation RF frequency variance | +/- 2 PPM max. with 0.1 PPM short term drift |
| Subscriber RF frequency | +/- 10 PPM (cost may force this to increase PPM)<br>(Note: Combined +/- 12 PPM results in frequency ambiguity which must be resolved via DSP/FFT operations) |
| Temperature of Operation | Industrial -40 to +85 deg. C. |
| EIRP | 1 Watt max.<br>note: typically 20 to 23 dBm power with 10 to 13 dB antenna gain<br>note: 4 W EIRP possible with restrictions |
| TX carrier suppression | Better than 25 dB relative to the peak<br>Sin(x)/x spectrum as measured with 100 KHz resolution bandwidth |
| Spurious emissions | Per FCC 15.247, 15.205, and 15.209 |

Modulation and CDMA Coding

As Modulation and CDMA coding are well known in the area of wireless communications, one skilled in the art understands that changes can be made to fit a particular implementation. The following table provides the modulation and CDMA coding techniques used in the present implementation.

| | |
|---|---|
| Symbol Rate | Primary rate: 40 Ksymbol/sec (equal to RW repition rate)<br>Acquisition/Pilot rate: 2.5 KHz (16 symbols per acquisition symbol) |
| CDMA Chip Rate: | 2.560 Mchip/sec (Note: Burst rate is 2x aggregate 1.280 Mchip |
| Burst Frame Length | 80 symbols (1 ms burst rate is 2x aggregate 1.280 Mchip) |
| Modulation Encoding | CCITT Gray coded DQPSK:<br>MSB  LSB  Phase Change<br>0    0    0 deg.<br>0    1    90 deg.<br>1    0    270 deg.<br>1    1    180 deg.<br>(Note: MSB, left most bit, is always "first in time") |
| CDMA RW Code | 32 chip RW code (15 dB nominal processing gain)<br>Walsh generator:<br>This results in RW codes:<br>RW 0: 00000000000000000000000000000000<br>RW 1: 01010101010101010101010101010101<br>.<br>.<br>.<br>RW 31: 01101001100101101001011001101001<br>(Note: With the exception if Base to Subscriber Differential Phase/Antenna Reference, an RW code is used for an entire burst frame.) |
| Pseudo-Noise (PN) code | 512 chip Gold code, equivalent to 1 acquisition symbol (27 dB nominal processing gain):<br>• Sum of 2 R9 maximal length PN codes with appended DC balance bit<br>• 7 codes are required for system deployment (maximum 7 frequency reuse)<br>• Chosen by computer search for lowest cross correlation<br>• 5 code repetitions per frame.<br>(Note: Ensures compliance to FCC/ETSI spreading requirements) |
| Symbol code | 16 symbol Rev. sequence at symbol/RW repetition rate<br>Normal operations: 0000000000000000<br>Acquisition:      0101010101010101 |
| Symbol/Code Modulation | Applied to I and Q quadrature legs of the modulated symbol:<br>Spread signal = (Modulated Symbol)⊕((PN⊕RW⊕(Symbol Code))) |
| Code/Symbol Time Distribution | Basestation: locked to network time (With TX and RX aligned)<br>Subscriber: Slaved to network time as recovered at RX; TX offset from RX set by radio overhead commands from Base to Subscriber.<br>(Note: Phase Lock of subscriber reference to recovered base is required.) |
| Subscriber RX/TX Fine Code Phase Offset | 1/32 chip minimum (i.e. independent TX/RX fine clock adjustment) |
| Data Scrambling | None, if block codes are used |
| Digital Base Band Filtering | See RF Specification above |
| Multiple Channel MODEM function | 2 independent 32 KBPS or 1 concatenated 64 KBPS channel minimum (see Frame Structure below) |

Forward Error Correction

As addressed above in the discussion on co-channel interference (CCI), Forward Error Correction (FEC) is needed in the present implementation. Application of FEC to FDD cellular, WLL, and satellite links has traditionally used convolution encoders with soft decision Viterbi decoders. With communications links in both directions being continuous and having duration of operation which greatly exceeds the required trace back memory (typically 7 to 9 times the constraint length), the ramp up and synchronization of the convolution decoder is typically not an issue.

Combined with a lack of frame synchronization requirements for decoding and typically 5 dB of coding gain for rate ½ codes, convolution encoders are a natural choice. For burst or framed channels, block codes have been found appropriate in particular applications. CD players, disk drives, pagers, LANs, and other burst or frame oriented applications all use block codes.

The recovery of CDMA codes and correlation measurements provides an independent method of establishing the start of frame for application of block codes. The use of block codes provides the ability to easily trade off correction capability for latency. This in turn allows for the use of burst/packet messaging for control of the present invention.

One skilled in the art can implement various methods of forward error correction. By means of illustration, burst forward error correction is used in the present TDD implementation of the present invention. One option is presented in the following table.

| | |
|---|---|
| (24, 12) extended Golay code | Bit extension of octal 5343 Golay polynomial (triple error correction) w/1/2 frame symbol interleaving |

FEC is applied to specific fields/bits in the burst frame. The frame structure is described more fully below, however, for the present discussion, it is sufficient to understand that the fields are divided into three groups:
1. Block FEC protected bits: 72 bits which carry traffic (voice or data) and telecommunications control
2. Soft FEC protected bits: 4 bits of radio overhead protected by separate software FEC
3. Unprotected bits: 4 bits for guard, phase reference, and antenna diversity select (Note: as guard symbols are increased to accommodate larger service radii, the bits also increase accordingly.)

One skilled in the art understands that there exist various other methods of using forward error correction in a burst frame structure. However, for in illustration purposes the (24,12) Golay FEC is discussed in more detail as applicable to the present implementation.

The block-protected bits are divided into two 36-bit fields. This results in three FEC blocks and 72 bits. At the transmitter, the 72 bit field is interleaved to spread single burst errors across all three FEC blocks where the interleaved bits are DQPSK modulated. At the receiver, the bits are demodulated, de-interleaved and decoded. By dividing the Burst into 2 fields, there results a 50% reduction in the interleaved delay.

Figure 4:
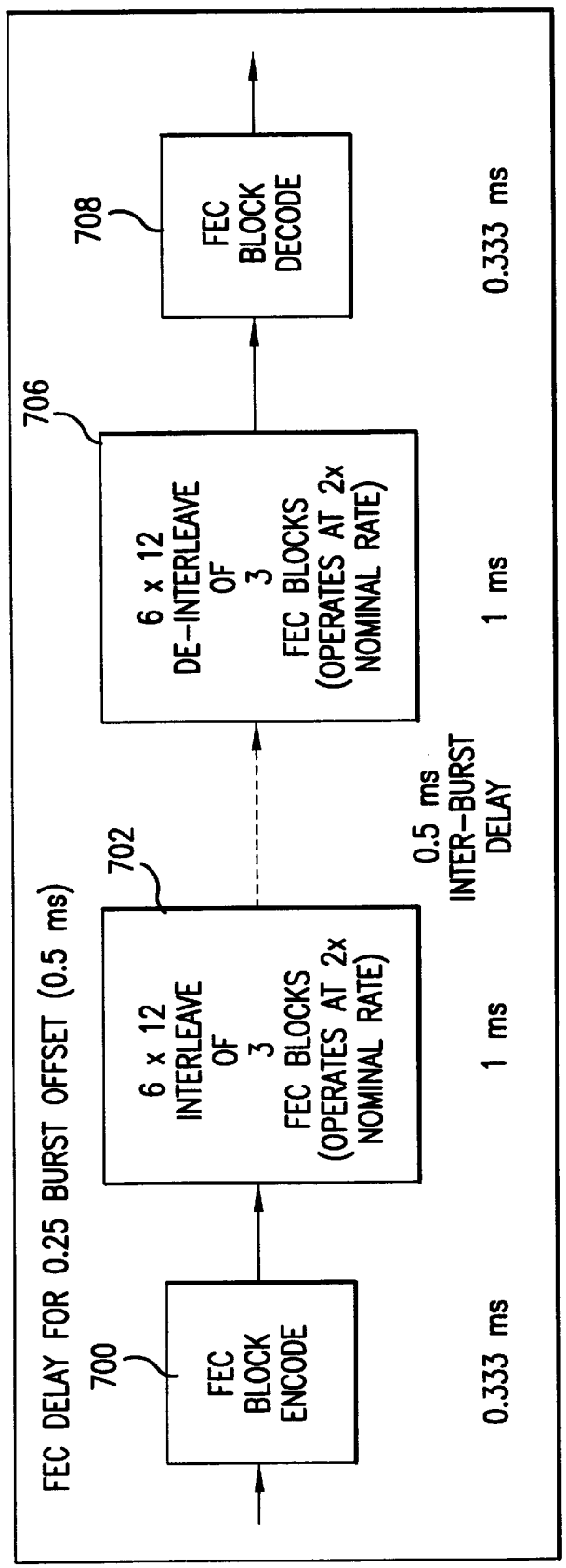
FIG. 4 illustrates delays associated with forward error correction according to the present invention.

FIG. 4 illustrates the delays associated with the FEC processing. FEC Block Encode 700 and Decode 708 delays result in a 0.333 ms delay each. Interleave 702 and De-Interleave 706 delays result in a 1 ms delay each. And, the Inter-Burst 708 delay results in a 0.5 ms delay. The aggregate delay is thus 3.166 ms.

The 3.166 ms delay is a worst case implementation. If a systematic encoder (i.e. GF(2) algebraic encoding) is used, the delay can be shortened to several symbols as opposed to a complete block resulting in a possible savings of 0.333 ms and a revised one-way delay of 2.833 ms. A similar implementation could be made for the decoder side. The use of erasures (3 value soft decoding, +1, 0, −1) or soft decision decoding is also contemplated.

Figure 5:
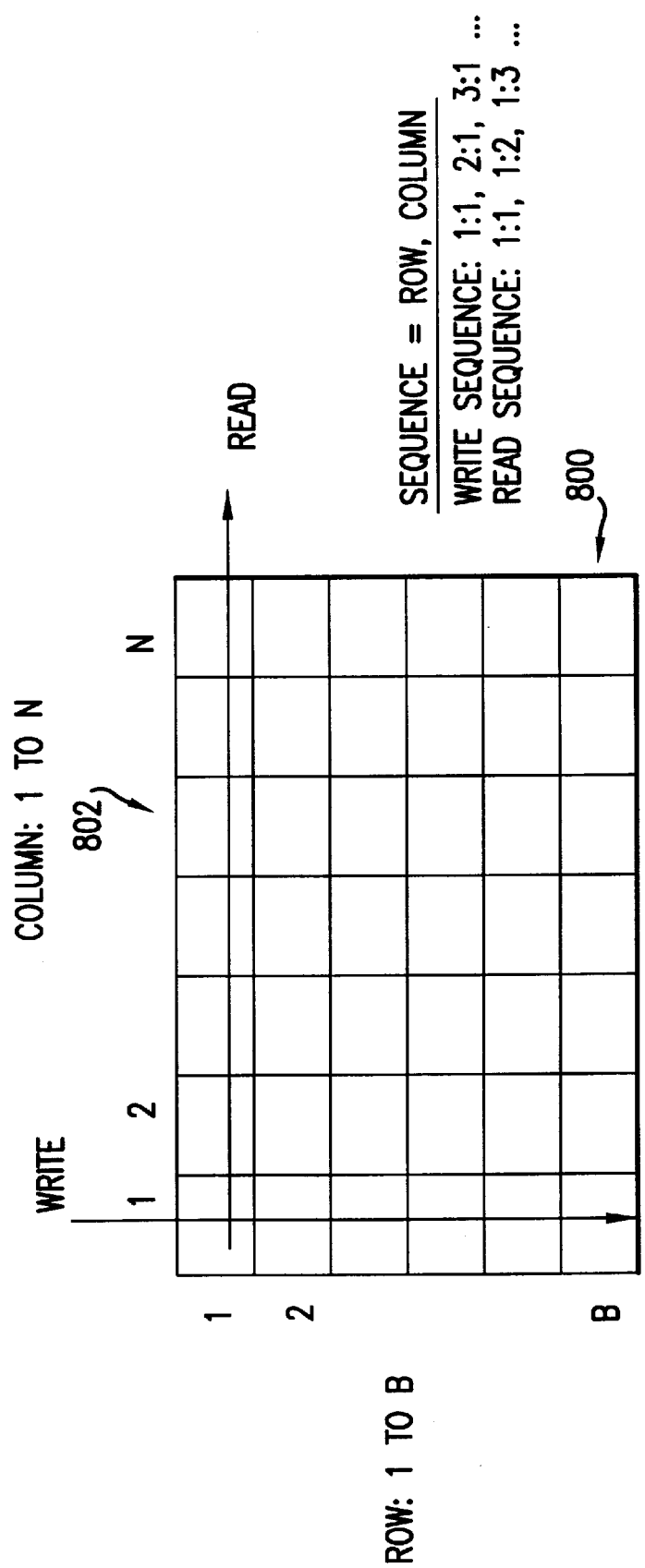
FIG. 5 illustrates an interleaver structure according to the present invention.

FIG. 5 illustrates the interleaver structure. A (6,12) interleaver, with 6 Rows 800 and 12 Columns 802, is applied to the 3 concatenated encoded blocks. This structure results in spreading a burst of 7 errors to, at most, 3 errors in any one block. The block decoder then exceeds the burst error capability of a Viterbi R=½, K=7 coding system for burst errors.

The Radio Overhead channel is protected by a separate "soft encoding". These fields are naturally interleaved by the frame structure and operate at a nominal rate of 2 KBPS or less. The content of these fields provides fine adjustments in TX time offset and power out of the subscriber from the basestation. Because TDD operations allow for "open loop" TX power control and because of the fixed access nature of WLL systems, only a few timing adjustments after initial acquisition are necessary. Fine control of these properties greatly decreases the self-noise typical of all CDMA systems.

As fields discussed here are critical to a present implementation, enhanced FEC can be applied without impacting the performance or delay in the traffic bearing fields.

Burst Frame Structure

Figure 6:
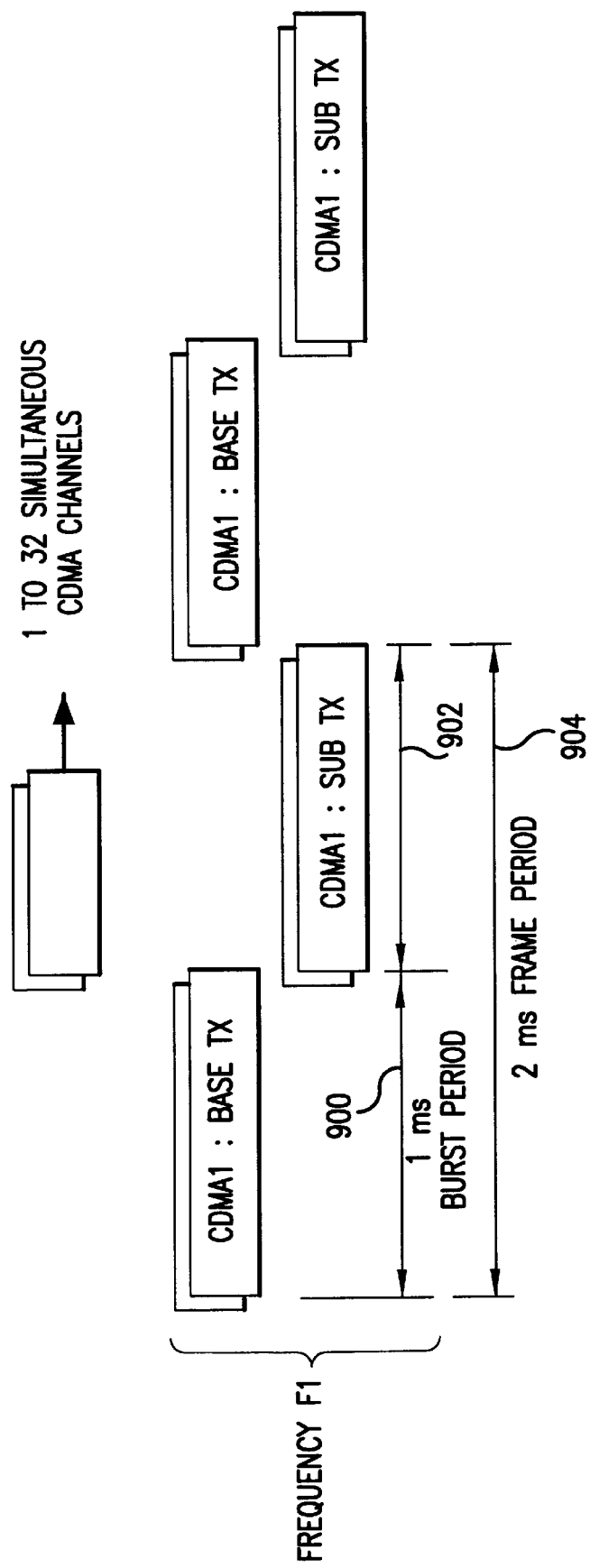
FIG. 6 illustrates a top level time division duplex (TDD) burst frame structure according to the present invention.

FIG. 6 illustrates the top-level TDD burst frame structure used in the present implementation. The present invention is based on a 1 ms burst, 2 ms burst period TDD structure. At each burst period 900 and 902, up to 32 simultaneous time synchronous CDMA channels can be transmitted in each direction. The two 1 ms bursts 900 and 902 result in the aggregate 2 ms frame period 904.

Figure 7:
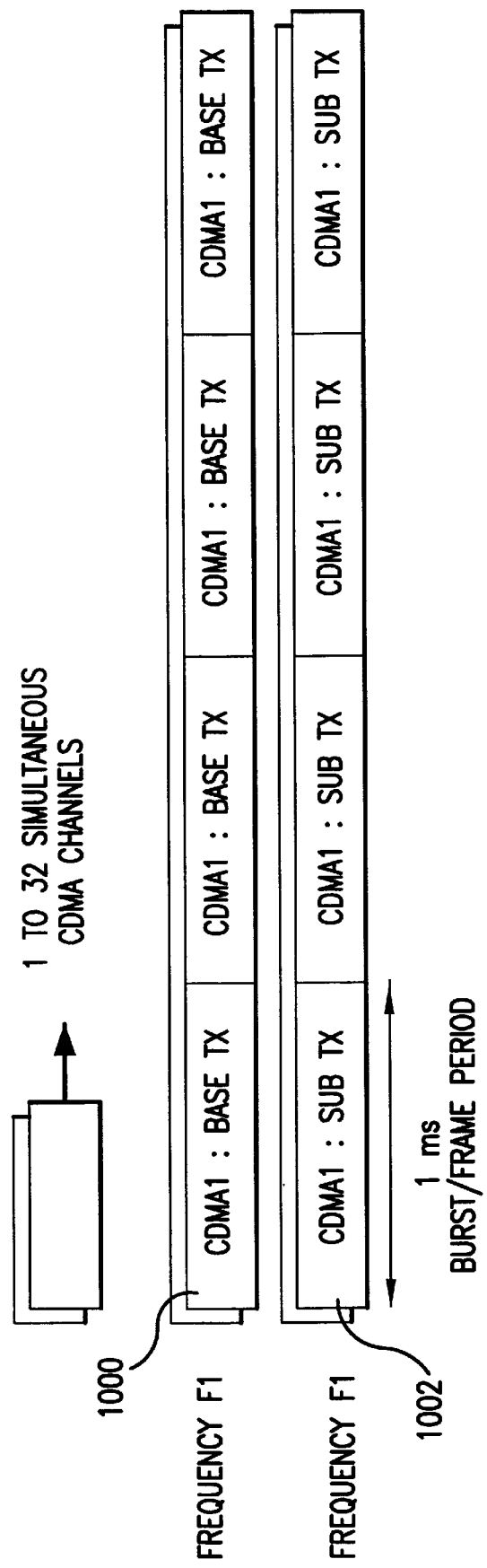
FIG. 7 illustrates a top level concatenated FDD operation according to the present invention.

FIG. 7 illustrates FDD operation with this interface. With continuously concatenated frame transmission or by sending 2 separate TDD channels in the FDD duplex channels, FDD structures 1000 and 1002 are achieved.

Figure 8:
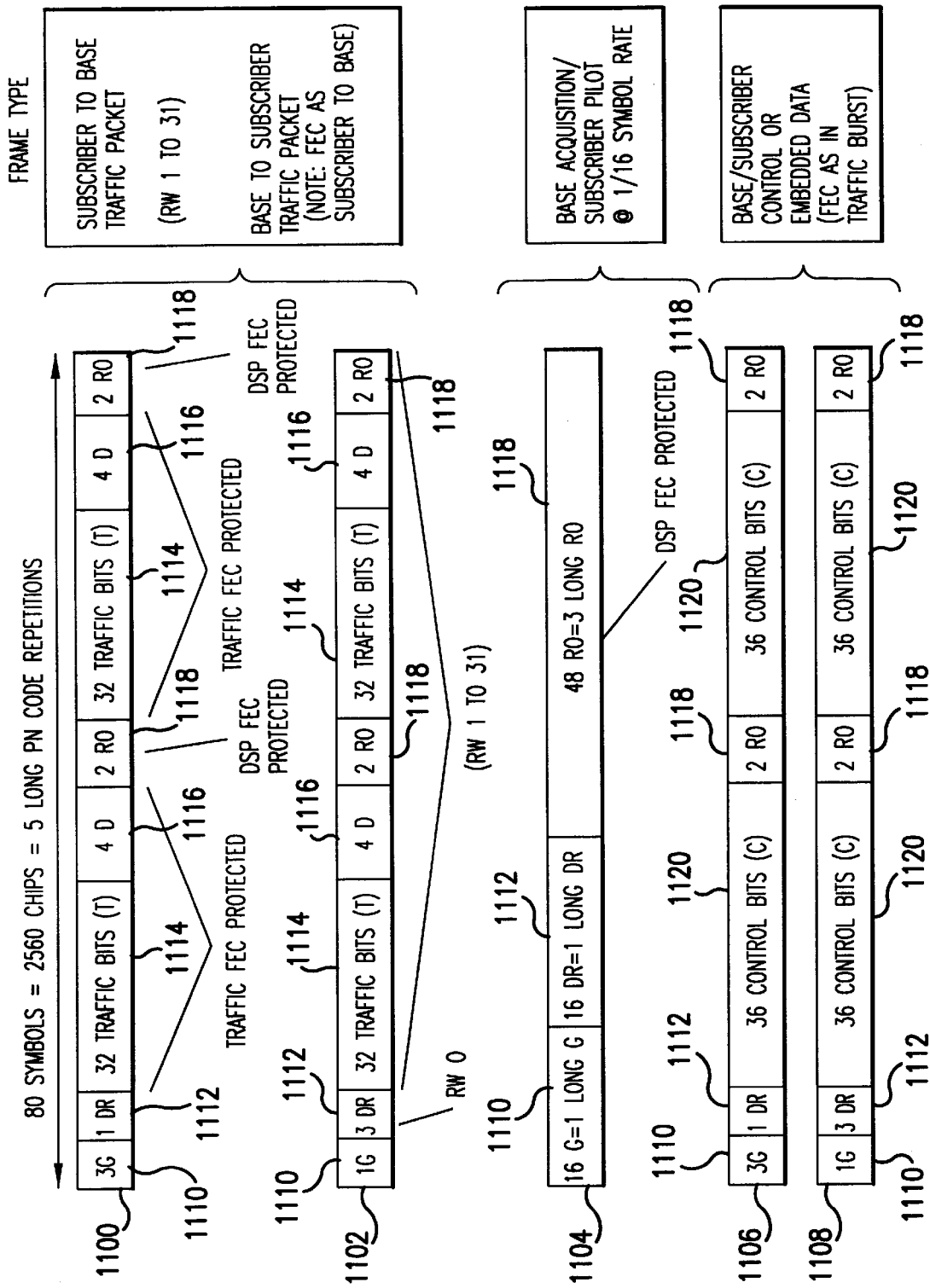
FIG. 8 is a detailed diagram of three types of frame structures according to the present invention including the extension of a guard band.

The burst frame structure provides a digital transport for:
Standard Traffic channels which provide basic POTS or ISDN via concatenation of CDMA channels,
Acquisition and Pilot channels which operate at 1/16 symbol rate and provides an additional 12 dB of processing gain (high gain subscriber RX synchronization, and asynchronous low interference subscriber TX synchronization with the basestation under radio overhead link control).
WLL System Control or Embedded Data (generally protected by HDLC/LAPD packet structure),
FIG. 8 provides a detailed diagram of 3 frame structure types. Any of the 32 available CDMA channel codes can be used with these frame formats. Subscriber to Basestation Traffic Frame 1100 and Basestation to Subscriber Traffic Frame 1102 operate as standard voice traffic channels. Acquisition and Pilot Frame 1104 is used to achieve receiver and transmitter synchronization. Control Data Frame 1106 and Embedded Data Frame 1108 provide basestation control and subscriber access functions as well as data service. Note that the frame structures have various fields which include the Guard (G) 1110, Differential Phase Reference (DR) 1112, Traffic (T) 1114, ISDN D or control messaging (D) 1116, Radio Overhead (RO) 1118, and Control (C) 1120.

| The symbol fields are defined as follows: | |
|---|---|
| G 1110: Guard | This field is used as a TDD channel guard period for TX power ramp-up and ramp-down. Extended guard bands are provided for subscriber transmit and for acquisition. |

-continued

The symbol fields are defined as follows:

| | |
|---|---|
| DR 1112:<br>Differential<br>Phase<br>Reference | This field is used for phase reference. An absolute Phase 0 degree reference is sent at the start of any burst to initialize the DQPSK differential detector at the receiver. The basestation sends 3 DR symbols to allow the subscriber to make measurements of a diversity antenna at each received packet. This burst is always sent on RW 0 with all other RW codes disabled. The measurement sequence is as follows:<br>  1) Switch to alternate antenna during guard symbol,<br>  2) Measure alternate antenna during DR1,<br>  3) Switch to primary antenna during DR2,<br>  4) Measure primary antenna during DR3 and continue demodulation,<br>  5) If the alternate antenna is significantly better, swap alternate and prime antennas at next RX, and<br>  6) Perform open loop TX power adjustment based on new measurement of RX burst. |
| T 1114:<br>Traffic | This field carries Traffic/Bearer data and may contain encoded voice, data, or any other data stream. The baseline system supports at 32 KBPS in a single channel. As described previously, this field is FEC protected. |
| D 1116: ISDN<br>D channel or<br>Proprietary<br>Control<br>Messaging | This field functions as either an ISDN D (Q.931 control messages) channel or a proprietary control interface which is a superset of Q.931. The channel provides for call control and other associated system messaging during operations of a CDMA traffic channel. The data in this channel is protected by HDLA/LAPD transparent frame formatting. The baseline system supports 4 KBPS throughput for a single channel. This field is FEC protected as discussed previously. |
| RO 1118:<br>Radio<br>Overhead | This field supports low level physical layer control of subscriber TX power and TX timing offset by the basestation. This field is only used with Traffic and Acquisition/Pilot CDMA channels. For these channels a one-to-one link exists between the subscriber ands the basestation. Either 2 KBPS or 1.5 KBPS throughput are provided based on rate 1/2 coding. This field is protected by "soft FEC" as discussed previously. |
| C 1120:<br>Control | This field is used for in basestation system control, software download, subscriber line concentration access request, subscriber control response and bi-directional embedded data service. Note that this field is a combination of the T and D fields of the Traffic frames 1100 and 1102 and can provide data service at 36 kbps (i.e. 32 + 4 kbps). All packet traffic in these channels is intended to be transmitted using HDLC packet framing. Two types of packets are:<br>Standard LAPD for basestation to subscriber incoming cal initiation (Q.931), software download, OAM&P, system flow control messages, and all embedded data messages. Note that it is necessary to fragment data to 128 byte or less.<br>Burst control packets for single burst frame messages which are modified HDLC packets transmitted in a single frame and consist of 7E flag, 4 byte message, 2 CRC 16 bytes, 7E flag, and trailing 1's. These |

-continued

The symbol fields are defined as follows:

| | |
|---|---|
| | messages are for embedded packet ACK, NACK, RTS, and CTS, subscriber to base access messages, subscriber to base control responses, and basestation to subscriber start of access frame messages. |

As shown in FIG. 8, the subscriber-to-basestation packet implements 3 guard, G, symbols and the basestation-to-subscriber packet implements 1 guard, G, symbol. In designing the present 36 kilobit per second system presently being described, such an implementation allows for servicing a service radius of approximately 5.5 kilometers. Because of the nature of rural applications of WLL systems, it is necessary to provide service to larger areas. As such, the present invention allows for the extension of the guard symbols by 2 (+2), 4 (+4) and 8 (+8) symbols as necessary. Thus the present 80 symbol field would be extended to 82, 84, and 88 symbols, respectively. To implement such changes, the clock frequency is increased appropriately (ie, 2.5%, 5%, and 10% respectively. Slightly wider bandwidth is necessary for increasing the clock speed, but the benefits, where necessary, are appropriate. Such is the application of the present embodiment, however, one skilled in the art can apply these concepts so as to provide service to any radii in an area of service.

TCP/IP Fragmentation

As discussed above, the packet structure of a WLL system is not optimized for the length of TCP/IP data. Where TCP/IP typically uses 512 bytes of data plus packet header information, the message may be too large for digital wireless implementations. Furthermore, long packets cause delay and have higher fail probability that would require retransmission. To resolve this problem, fragmentation is implemented where the original packet is split into multiple fragments with a minimum of 1 byte and a maximum of 64, 128, and 256 bytes based on a baseline 32 kilobit per second WLL system. The size is capable of being dynamically changed to improve efficiency. It should be noted that fragmentation complicates the design by requiring, among other things, more memory and CPU cycles for the packet assembly and disassembly (PAD) functions.

Figure 18:
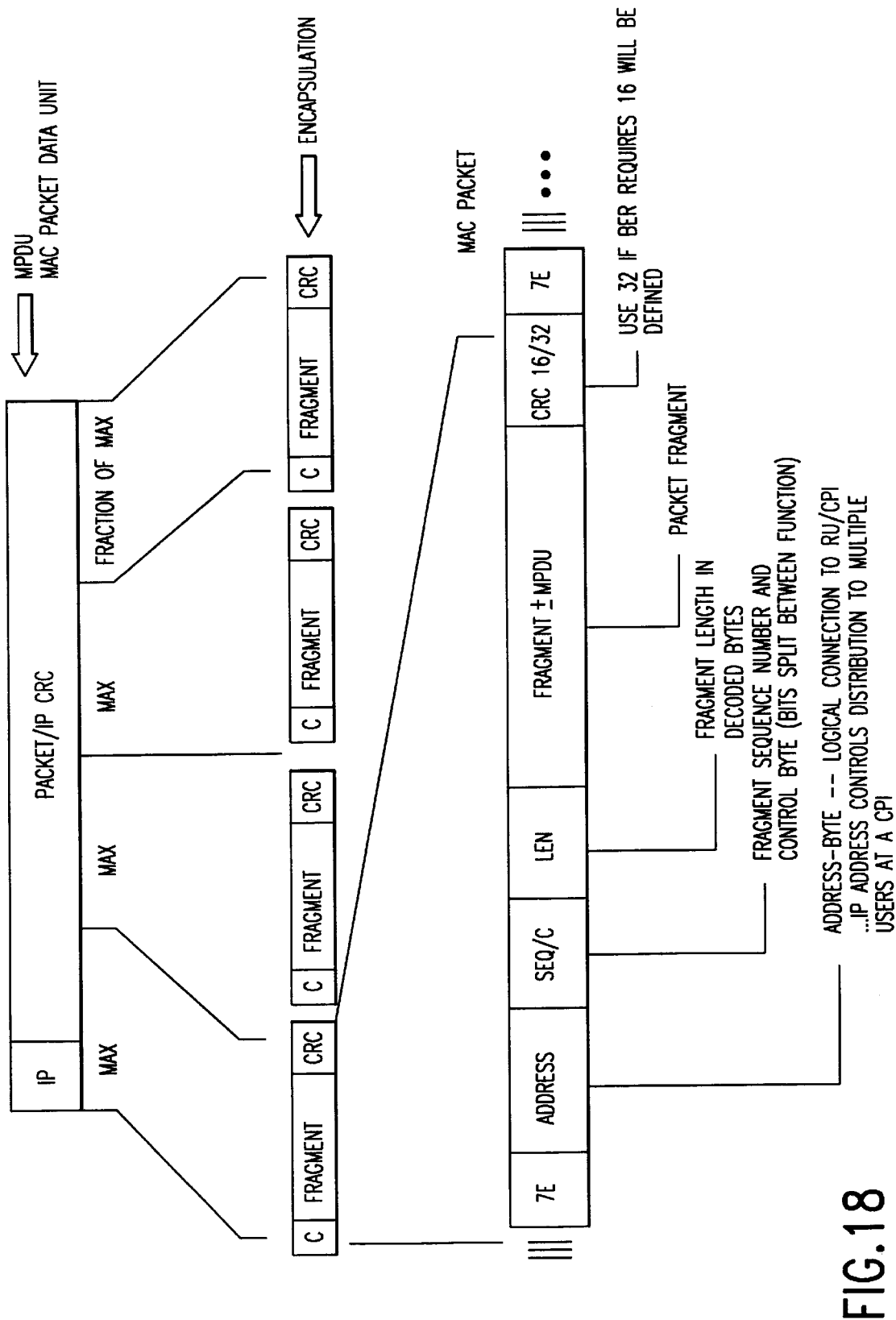
FIG. 18 is an illustration of the fragmentation of a message for proper transmission according to the present invention.

FIG. 18 illustrates how the typically long TCP/IP message is fragmented into pieces of appropriate length for transmission in the WLL system of the present invention. The TCP/IP message is divided up into several fragments of maximum size that can be handled by the WLL system. The last fragment is not necessarily of maximum length depending on the length of the message. The fragments are then encapsulated with certain information including: an address byte; a fragment sequence number and control; fragment length; a packet fragment; and, 16 or 32 bit CRC. The address byte, ADDR, is effectively the logical connection to the receiver unit and the customer premise interface. Where the IP address controls distribution of information to multiple users on the internet, this address controls the distribution of data at a customer premise interface on the WLL. The fragment sequence number and control byte, SEQ/C, provides information on the position of the fragment sequence in relation to the whole packet. Where fragment lengths may differ, the fragment length, LEN, provides the length of the fragment in decoded bytes. The fragment of the packet data then follows where the various fragments can be concatenated to reproduce the entire data packet. Finally, CRC information is sent.

Protocols

Channel Description

Figure 9:
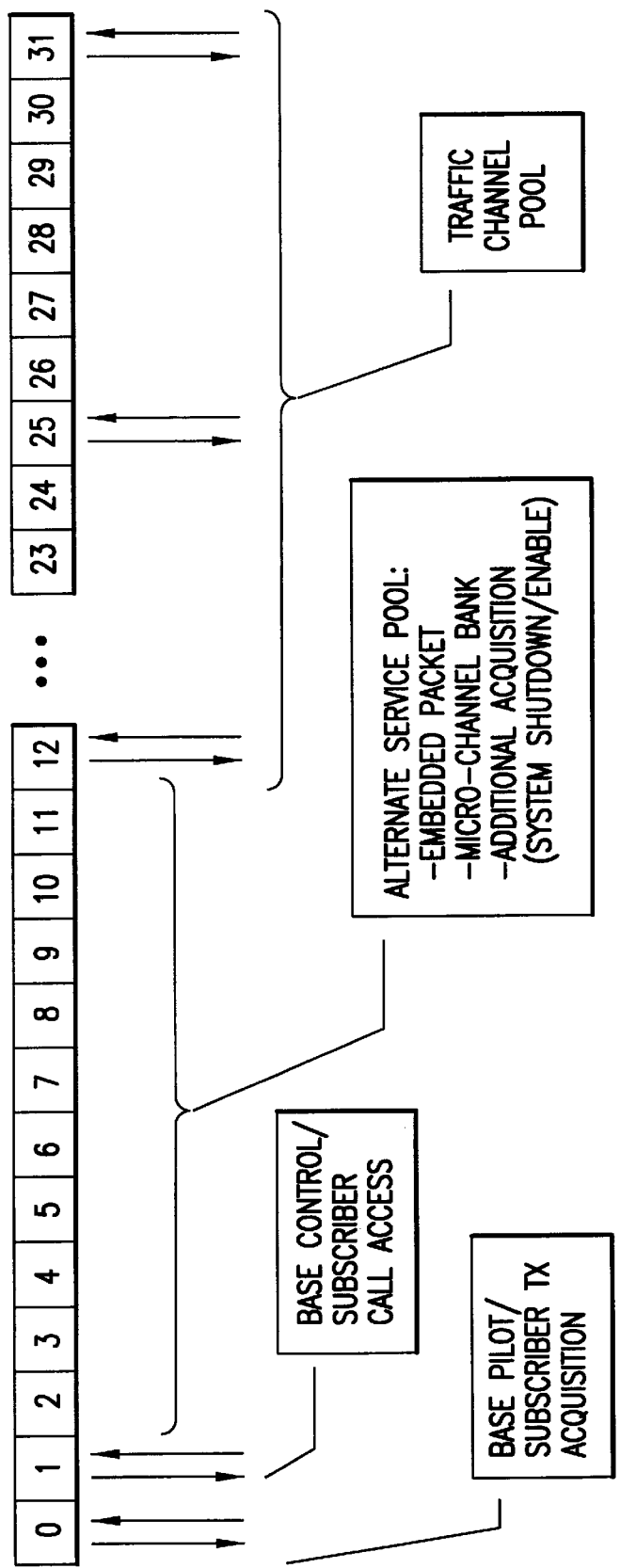
FIG. 9 provides an example of pool allocations for a single sector/frequency implementation according to the present invention.

A single WLL TDD frequency/sector provides a pool of 32 independent CDMA channels. This pool of channels is divided into smaller pools of CDMA channels providing specific service between the subscriber terminal and the basestation. Based on system traffic demands (call activity), user traffic channel requirements (36 kbps embedded data, 32 kbps voice, 64 kbps voice, etc.) and RF interference levels, the number of CDMA channels assigned to any pool can be varied to meet demands. This capability is termed "Dynamic Pool Sizing", and represents a fundamental advantage that the present invention. FIG. 9 illustrates an example of channel pool allocation for a single sector/frequency implementation. With Dynamic Pool Sizing, the number of channels assigned to a particular function at any given time may be different than in FIG. 9.

The following table provides a description of the channel function and content. In many cases, functions are logically paired between the subscriber and the basestation, but as described previously, asymmetrical channel allocation may be utilized in providing data service.

| | |
|---|---|
| Base Station Pilot 1200 TX: Basestation to Subscriber | This channel is assigned to CDMA channel 0 typically operates continuously. The channel is used by all subscribers to achieve full receiver synchronization prior to switching over to the Basestation Control channel to wait for a specific acquisition grant command. The radio overhead carried by the this channel can be used to ensure valid synchronization by any subscriber. This channel is paired with Subscriber Acquisition on the same CDMA channel. In case of complete system failure or power down, Dynamic Pool Sizing may allocate additional Pilot/Acquisition CDMA channels for rapid service recovery of the system. |
| Subscriber Acquisition 1202 TX: Subscriber to Basestation | This channel is paired with Basestation Pilot. A subscriber can initiate transmitter synchronization with the base station on this channel after receiving an acquisition grant command from the Basestation Control channel. The subscriber acquires Radio Overhead synchronization of the paired Basestation Pilot and performs transmitter power and time offsets based on commands from the basestation. Once acquisition is complete, the subscriber returns to Basestation Control channel for Authentication and normal operations. When synchronization is achieved and the duplex link is established, the transmitter power, transmitter power relative to receiver power and transmitter time offset relative to receiver time can be retained as "warm acquisition parameters". This channel can also be used to "refresh" synchronization of any active subscriber in the system. In cases of complete system failure or power down, Dynamic Pool Sizing may allocate additional Pilot/Acquisition CDMA channels for rapid service recovery of the system. |
| Basestation Control 1204 TX: | This channel is assigned to CDMA channel 1 typically operates continuously. This channel provides the following functions: |

-continued

| | |
|---|---|
| Basestation to Subscriber | Establishes Start of Access Frame using a single Burst Control packet (Once every 128, or 256 TDD time slots = Access frame length [0.25 to 0.5 seconds]) Authenticates subscriber using LAPD Sets up incoming calls (base to subscriber) using LAPD Sets up outgoing calls based on subscriber request in Access Frame Slot using LAPD Provisions using LAPD Provides OAM&P functions using LAPD Downloads software using LAPD Provides embedded packet service using LAPD This channel is paired with Subscriber Access. |
| Subscriber Access 1206 TX: Subscribe to Basestation | This channel is assigned to CDMA channel 1 typically operates continuously. This channel is used for outgoing call set-up and to respond to LAPD commands sent on the Basestation Control channel. Only burst control packets are sent by subscribers. The Access frame is either 128 or 256 slots long based on the level of concentration in the deployed cell. Two types of slots are provided: Fixed assigned poll slots for outgoing call establishment, emergency calls, and response to specific commands. Fast response slots (every 16th slot, 0, 16, 32, 48, . . .) for immediate response to incoming call message by the called subscriber. A subscriber is assigned a specific slot in the Access frame during the Acquisition procedure. This channel is paired with Basestation Control on the same CDMA channel. |
| Traffic 1208 Bi-directional link, Subscriber to Basestation and Basestation to Subscriber | CDMA traffic channels are a pooled resource and are dynamically allocated under Basestation control. These channels are assigned as a single CDMA channel pair for a complete traffic and control link between the subscriber and the basestation. Once handed over to a traffic channel, all call control and call tear down is established via the D channels embedded with this link. As the provisioning of a subscriber to 1 or more user interface lines is known by the basestation, the D channel can be used for call establishment of one or more secondary lines while a line is in use. Dynamic switching of rates for 32 K to 64 K can also be supported. |
| Micro-Channel Bank 1210 Bi-directional link, Subscriber to Basestation and Basestation to Subscriber | Micro-channel bank requires 1 CDMA channel for bi-directional concentration control (superset of V5.2) and 1 to N MCB traffic channels. Using Dynamic Pool Sizing, the number of MCB channels can be changed based on demand. The Extended Radio Unit (ERU) acquisition procedures use the Pilot and Control channels as previously described. Once synchronization is established, the ERU is assigned to the MCB bi-directional concentration channel (a single CDMA channel) and behaves like a point to point microwave link. |
| Embedded Packet 1212 B-directional link, Subscriber to Basestation and Basestation to Subscriber | Embedded packet service for up to 8 users is provided on a single CDMA channel. Dynamic Pool Sizing may be used to allocate additional channels as more subscribers request data service. The characteristics of this channels are very similar to that of the Traffic channel described above except that it is not necessary to assign these channels as pairs -- the present invention provides for asymmetrical data service. A data access protocol is provided for: Service access request and authentication |

-continued

| |
|---|
| Assignment by the basestation to a specific CDMA channel or aggregate channel (i.e. using multiple CDMA channels) |
| Assignment of a virtual wireless access identifier |
| Mapping of the virtual wireless access identifier to a physical address (typically TCP/IP or novel IPX) |
| Packet Assembly and Disassembly (PAD) functions at both basestation and subscriber including fragmentation buffers and procedures for transport over the WLL |
| Modified token ring or Request-To-Send/Clear-To-Send (RTS/CTS) protocol is used |
| The basestation performs protocol conversion to a standard network protocol and provides a digital interface (typically fraction E1/T1 via frame relay) to a router at the central office for transport on the network. The subscriber station has a modified customer premise interface (CPI) specifically for data access. Specialized software is also provided to the subscriber for proper data transfers. |

TDD CDMA Acquisition Protocol

Figure 15:
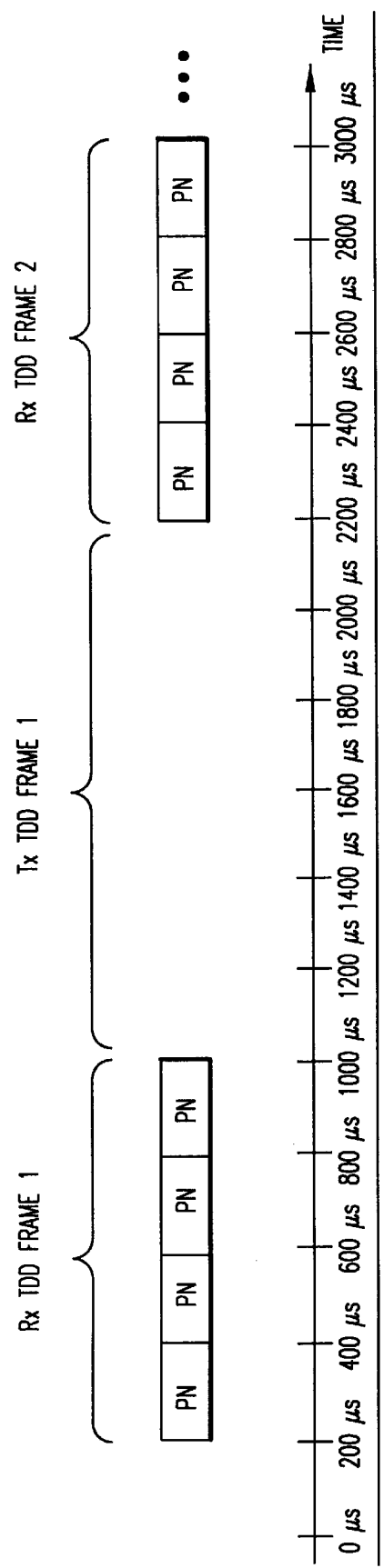
FIG. 15 is an illustration of the TDD frame structure with a time scale to show the details of the timing of a received TDD frame and a transmitted TDD frame according to the present invention.

The following describes the TDD CDMA acquisition scheme of the present invention. The frame structure is depicted in FIG. 15 where the waveform is split equally between a 1 msec basestation-to-RU burst and a 1 msec RU-to-basestation burst. When the guard band is taken into account, each burst duration is 800 $\mu$sec long leaving 200 $\mu$sec of guard.

There are three unknown parameters to TDD CDMA receiver synchronization: (1) carrier frequency, (2) PN phase, and (3) frame phase. The first step is to conduct an iterative procedure with both carrier frequency and PN phase to achieve local PN sequence synchronization. Once the local PN sequence is synchronized to the transmitted PN sequence, it is still necessary to align the TDD frame.

Figure 16:
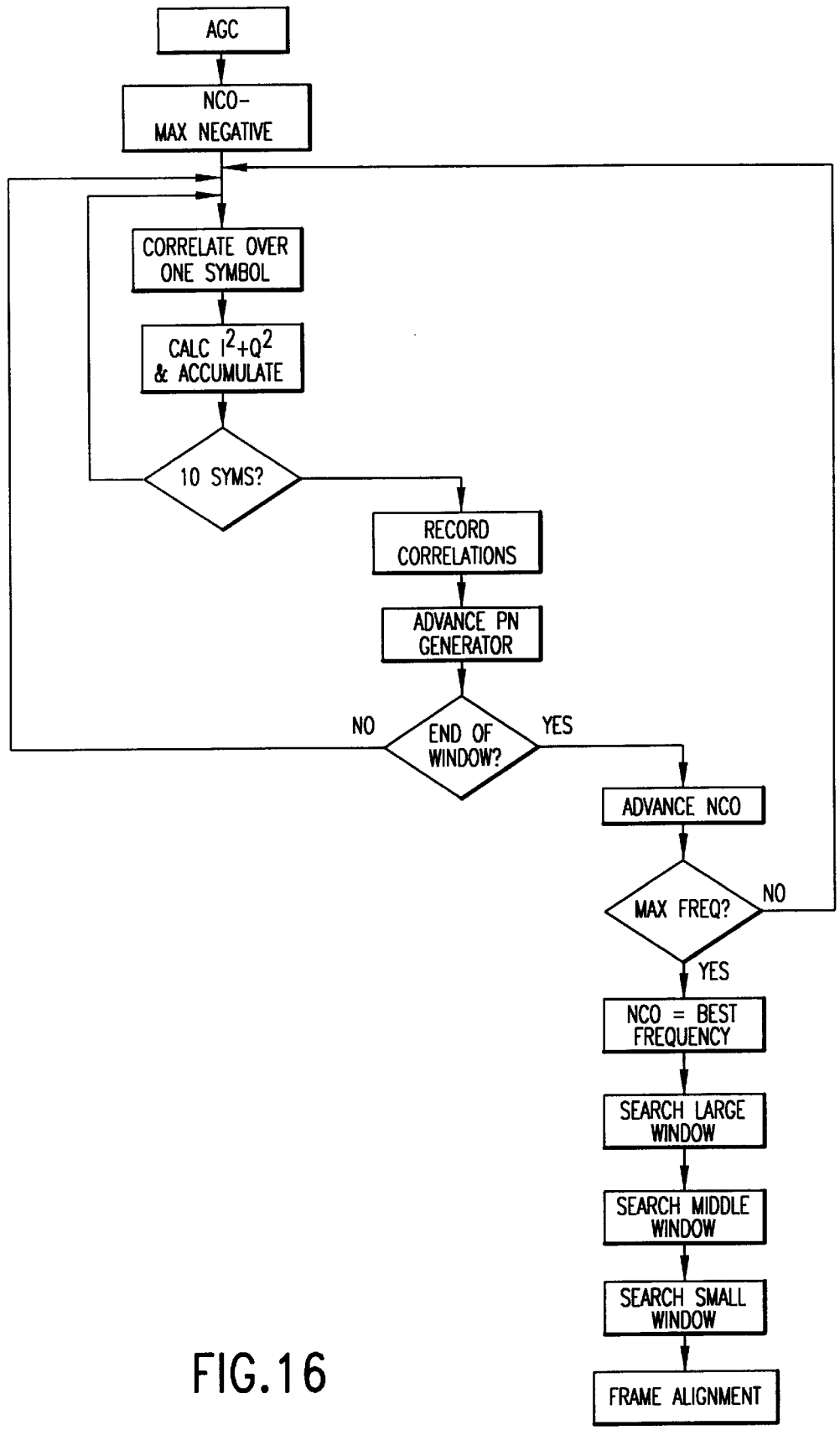
FIG. 16 is a flowchart of the TDD acquisition protocol according to the present invention.

PN sequence synchronization is an iterative process spanning all possible frequency offsets and phase shifts. FIG. 16 describes the process in a flowchart. The first step is to determine the frequency offset range for the receive carrier. For example, given 2 ppm, 2.4 GHz crystals on both the transmitter and receiver, the maximum carrier frequency error is 9600 Hz. Moreover, the QPSK tracking discriminator can only operate under a maximum frequency offset of ⅛th of a constellation spin, or 5 kHz/8=625 Hz. Thus, when transitioning from acquisition to code tracking, the RF carrier frequency must not be farther than 625 Hz off. Stepping in 1 kHz steps from $f_{nominal}$−10 kHz to $f_{nominal}$+10 kHz satisfies the above constraint.

This is an example where a typical system may have ±2 ppm at the basestation and ±8 ppm at the subscriber station which can result in ±24 kHz. Aging can add ±0.5 ppm to this budget per year.

Figure 17:
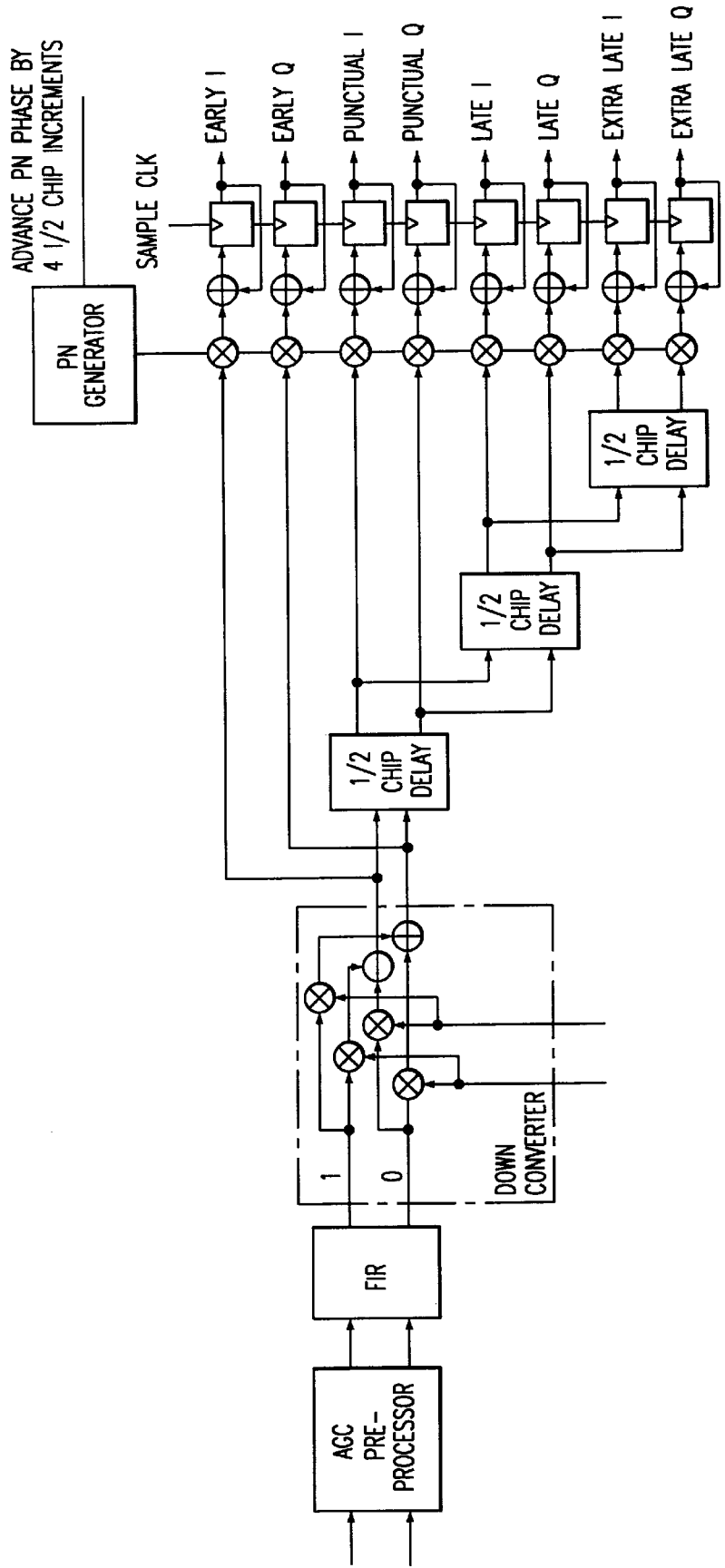
FIG. 17 is an illustration of the CDMA acquisition hardware of the present invention.

FIG. 17 shows the CDMA acquisition hardware where, initially, the DSP sets the frequency, f, of the down converter to equal $f_{nominal}$−10 kHz. Then, it enables the 4 correlators to accumulate over a full TDD frame. The correlators encounter a receive signal for 800 $\mu$s somewhere in that 2 ms TDD frame. If the Rx PN phase equals the local PN phase in one of the 4½ chip paths, the DSP reads a high correlation from one of the 4 correlators (early, punctual, late, or extra late). Otherwise, the DSP reads very low correlations. After each TDD frame, the DSP advances the phase of the PN generator by 4½ chips (or 2 chips) and correlates again. It repeats this process until it has tried all possible local PN phases:

Chip iterations per carrier frequency
=512 chips (or 256 TDD frames)+clock drift factor
=512 chips+maximum drift in 256 TDD frames measured in chips 512 chips+maximum clock drift 0.512 s
=512 chips+(100 ppm*2.56 Mchips/s)*0.512 s
=512+131
=643 chips
=322 correlations An enhancement to this architecture provides for more correlators and results in improvement by covering decreased chips per TDD frame. For example, increasing the correlators to 6 results in a 1.5 times improvement by covering 3 chips per TDD frame such that the iterations calculated above result in 215 correlations—a significant reduction.

The DSP keeps a record of the maximum correlation and its location for each of the 21 frequencies between $f_{nominal}$−10 kHz to $f_{nominal}$+10 kHz. When this process is complete, the DSP chooses the frequency that results in the maximum correlation.

Once the frequency has been chosen, the DSP can concentrate on PN phase alignment. First, it searches the entire 643 chip window as described above. Once it finds the maximum correlation, it adjusts the PN phase to the center of a smaller window, say ±30 chips. It then correlates from PN phase$_{nominal}$−30 to PN phase$_{nominal}$+30 in single 2-chip steps, noting the maximum correlation and its index.

Note that the location of the maximum correlation in this second search results in an estimate of PN frequency offset. If the maximum correlation occurs in the middle of the second window, there is very little difference between the receive PN frequency and the local PN frequency. If the maximum correlation is late, it indicates that the local PN frequency is lower than the received PN frequency. The opposite is true if the correlation is early. This information can be used to adjust the frequency of the local PN clock.

The maximum correlation of the second search window is used to determine a threshold for the third and final PN search. Once again, the DSP adjusts the PN to the center of a very small window, say ±3 chips. It then correlates from PN phase$_{nominal}$−3 to PN phase$_{nominal}$+3 in single 2-chip steps until it encounters a correlation greater than the threshold. At this point, the PN codes are synchronized to within ½ chip so the DSP allows the local PN generator to free-run.

PN synchronization does not imply frame alignment since the PN sequence is repeated 10 times over a TDD frame. To determine the correct frame phase, the DSP determines if there is an appreciable receive signal during each symbol by comparing the symbol correlations to a threshold. If the correlation is above the threshold, the frame is currently in receive mode. Otherwise, it is in transmit mode. Quickly thereafter, the receiver sees a pattern of 4 high correlations in a row (corresponding to the receive burst) followed by 6 low correlations in a row (corresponding to the transmit burst). Once the DSP has seen a pattern of 6 low correlations, 4 high correlations, and 6 low correlations it knows to immediately set the frame phase to start at the beginning of the receive frame.

At this point the CDMA modem has acquired the receive burst. To remain synchronized, the modem transits to tracking mode where the DSP uses early/late to advance/retard code timing.

Acquisition and Call Processing

The following provides descriptions for subscriber acquisition, commissioning, and call processing. Before any subscriber can be commissioned for service, provisioning information for the subscriber Radio Unit must be entered into the basestation (unique ID, subscriber interface(s) supported, etc.). Without this information, the subscriber can achieve initial synchronization but fails authentication and is, thus, denied call/service access to the system.

Assuming a subscriber has been properly installed, the subscriber initiates a cold start acquisition process by successfully completing Subscriber Receiver Synchronization, Subscriber Transmitter synchronization, and Authentication. The following describes the procedures involved in setting up voice service, however, it should be understood that the same procedures can be used to set up data service. The only differences occur when the user goes "off-hook" or "on-hook" on the provided data interface.

Figure 10:
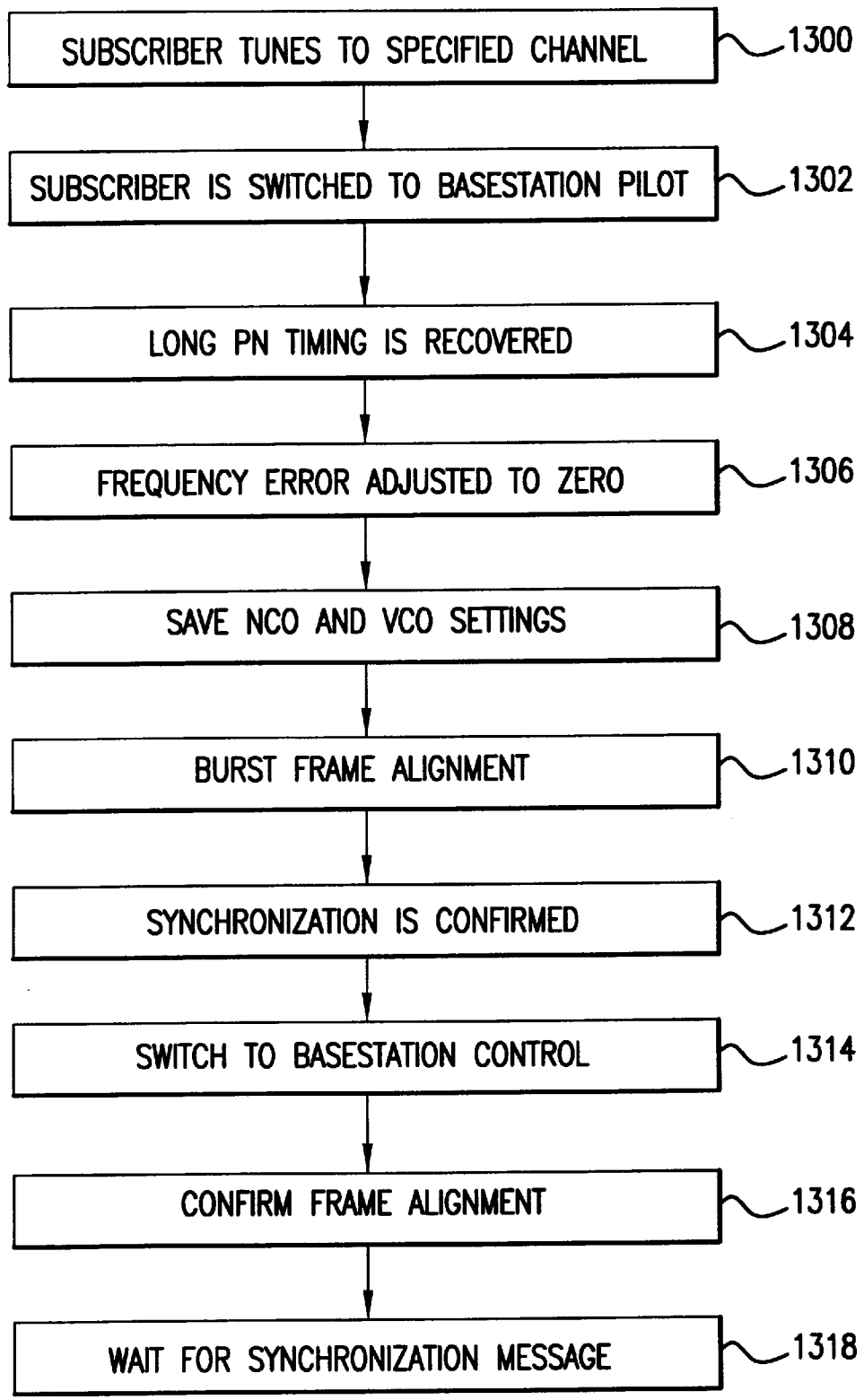
FIG. 10 is a flowchart of the Subscriber Receiver Synchronization procedure according to the present invention.

FIG. 10 provides a flowchart of the Subscriber Receiver Synchronization procedure. At Step 1300, the subscribers tunes to a specified RF channel. This step can be repeated to test all possible RF channels. The subscriber CDMA channel is then switched to Basestation Pilot (Step 1302) and long PN timing is recovered (Step 1304). The RF frequency error is adjusted to zero (Step 1306) and both initial NCO and VCO settings are saved for "warm start" (Step 1308). A Burst Frame alignment is then performed (Step 1310). Synchronization is confirmed by decoding of and alignment to the Radio Overhead frame (Step 1312). All data in the Radio Overhead frame is ignored until transmitter synchronization is achieved. The subscriber switches CDMA channels to Basestation Control (Step 1314) and confirms frame alignment (Step 1316). The subscriber then waits for a transmitter synchronization message (Step 1318) where provisioned serial number is used to direct the subscriber to initiate.

Figure 11:
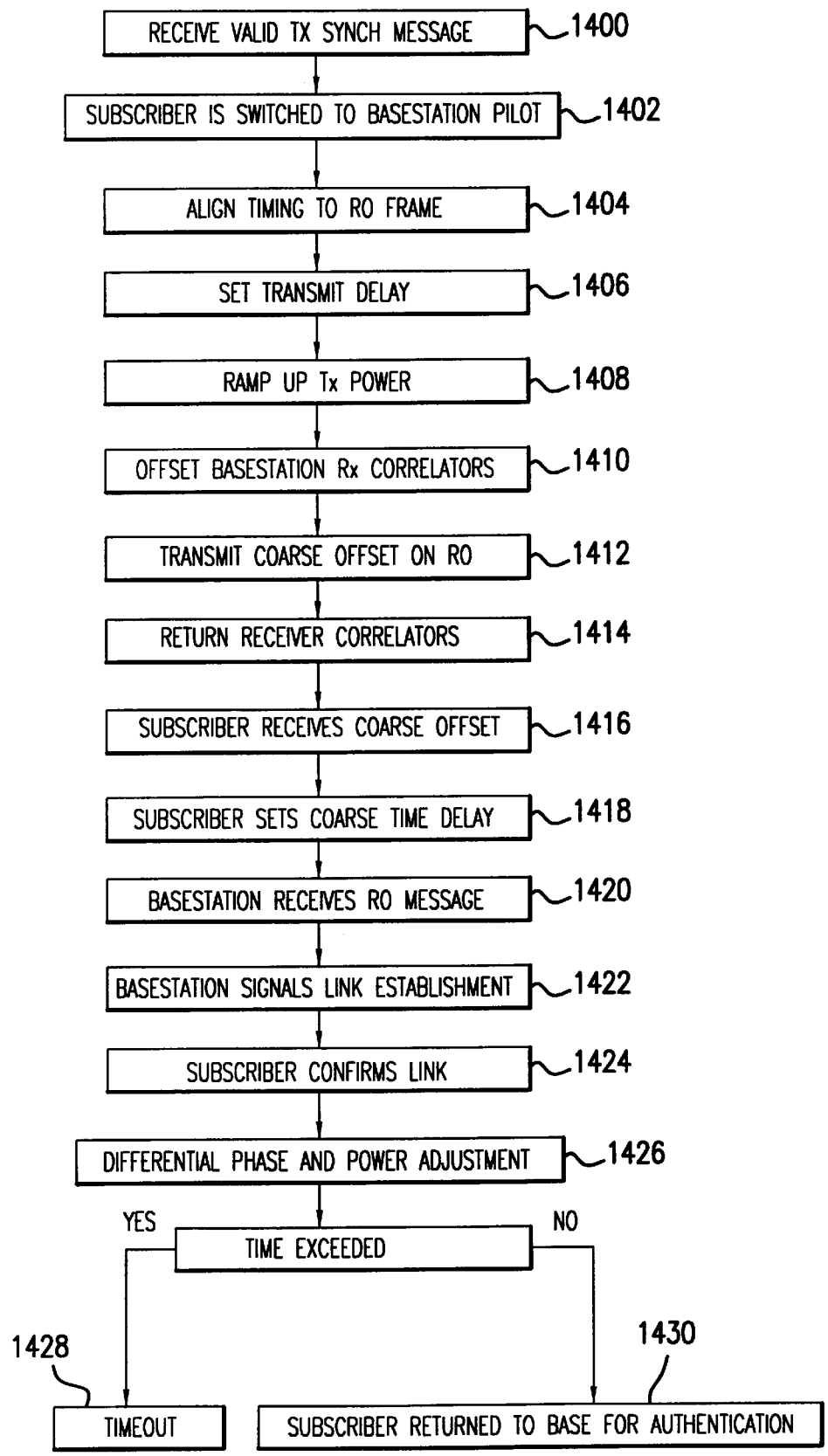
FIG. 11 is a flowchart of the Subscriber Transmitter Synchronization procedure according to the present invention.

FIG. 11 provides a flowchart of the Subscriber Transmitter Synchronization procedure. Upon receipt of a valid transmitter synchronization message (Step 1400), the subscriber switches to the Basestation Pilot channel (Step 1402). The subscriber aligns timing to the Radio Overhead frame (Step 1404) and sets the transmit delay (Step 1406) to the median time offset RX frame alignment. Transmitter power is then ramped up (Step 1408) to −15 dB of nominal power (full rate channel or −27 dB of low rate power). The open loop power control is used to adjust the power level based on every received frame. At the Basestation RX correlators are offset (Step 1410) from the transmitter frame by the median time delay. The Basestation then transmits coarse offset (Step 1412) on the Radio Overhead channel and returns receiver correlators (Step 1414) to the system TX/RX alignment position. Offset is transmitted until full link is established or time out occurs. When the subscriber receives the coarse offset message (Step 1416), the subscriber sets transmitter to coarse time delay (Step 1418). When the Basestation receives the subscriber Radio Overhead message (1420), the Basestation signals that the link is established with differential power and fine time adjustments set to zero (Step 1422). Through a handshake procedure, the subscriber confirms the link (Step 1424). The Basestation and subscriber then initiate differential phase and power adjustments until a complete alignment is achieved (Step 1426). These values are saved for "warm start". At this point, either a Time-out (Step 1428) occurs or the subscriber is returned to the Basestation Control channel (Step 1430) for Authentication.

Figure 12:
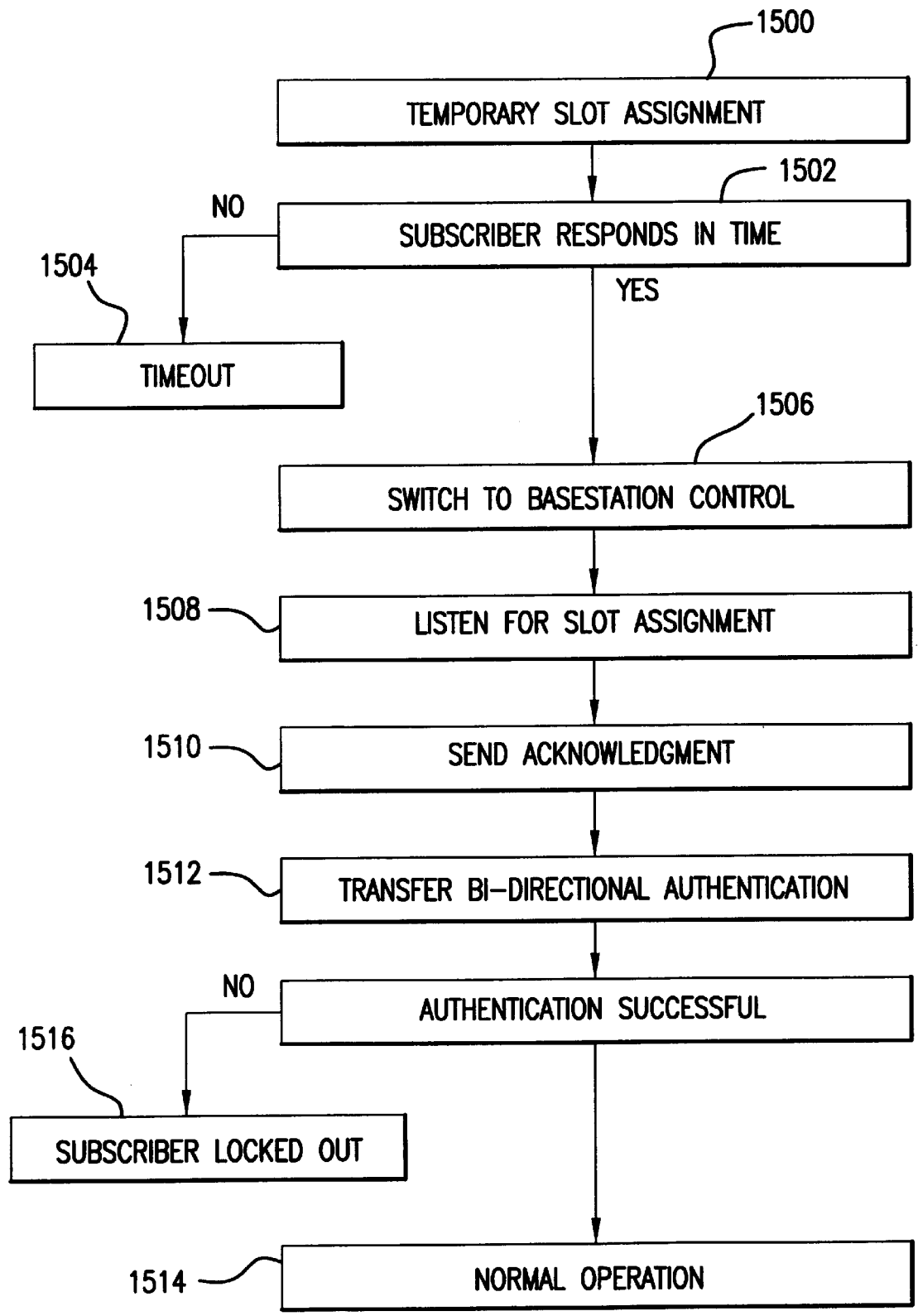
FIG. 12 is a flowchart of the Authentication procedure according to the present invention.

FIG. 12 provides a flowchart of the Authentication procedure. Upon successful completion of Subscriber Transmitter and Receiver Synchronization, the Control channel publishes a temporary slot assignment (Step 1500) to the newly synchronized subscriber until the subscriber responds (Step 1502) or a time-out occurs (Step 1504). If the subscriber responds, the subscriber switches to the Basestation Control channel (Step 1506) and listens for the slot assignment (Step 1508). Upon receipt, the subscriber sends an acknowledgment (Step 1510) during the assigned time slot. At this point, bi-directional authentication messages are transferred (Step 1512) and, if successful, the subscriber now begins normal operations and the assigned slot is made permanent for normal operations (Step 1514). If this procedure is unsuccessful, the user is locked out of the system (Step 1516)

Normal operations consists of incoming and outgoing call establishment, software download, and OAM&P functions. subscriber may exist in three states: STANDBY state, OPERATION IN PROGRESS state or ACTIVE (Traffic) state. If a subscriber provides more than one line of service, status is kept on the individual lines. During either an incoming or outgoing call, the Radio Overhead channel is used to provide fine adjustment of transmitter power and timing and to provide the values needed for "warm start".

Figure 13:
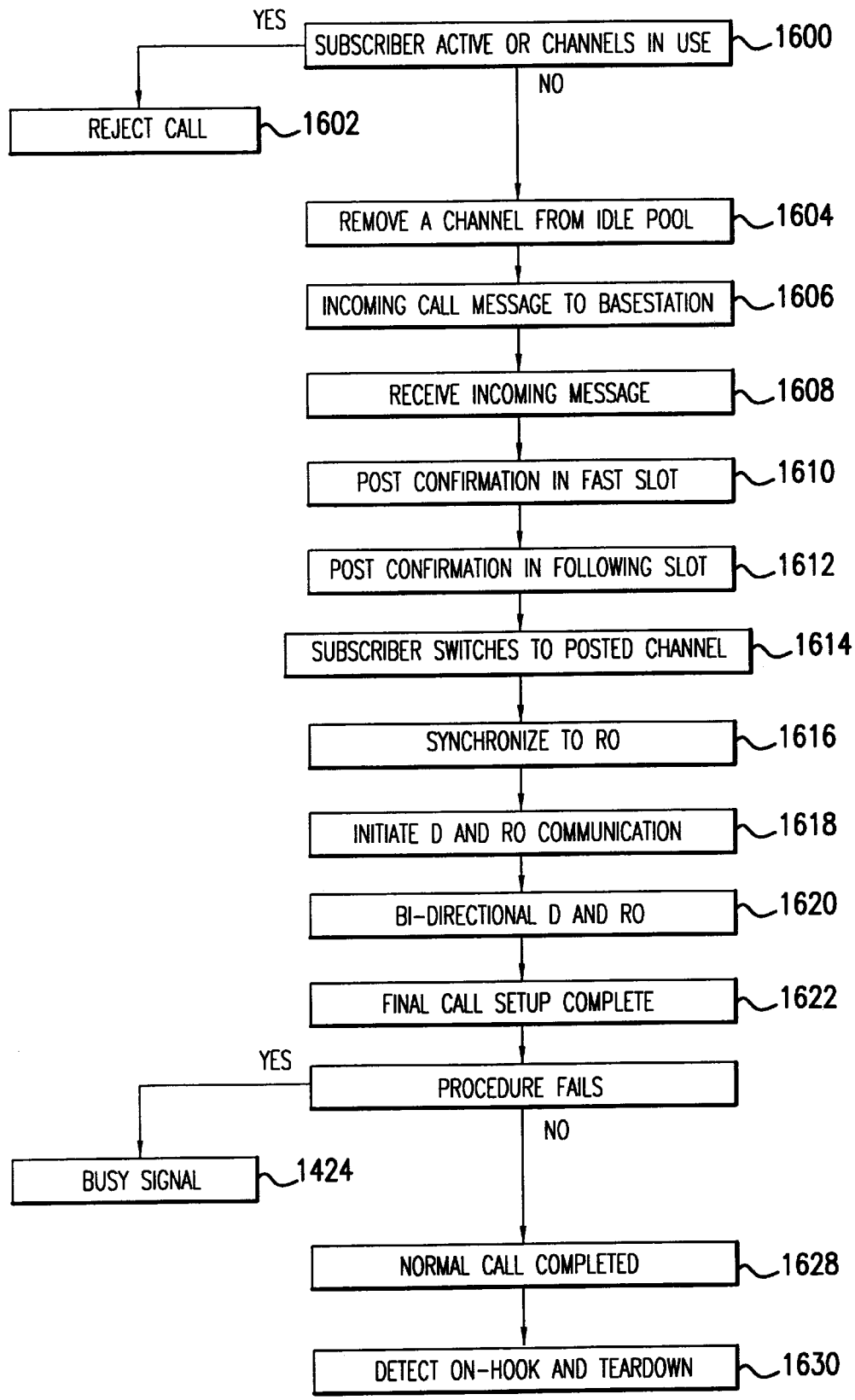
FIG. 13 is a flowchart of the procedure to establish incoming calls over the Basestation Control channel according to the present invention.

FIG. 13 provides a flowchart for the procedure to establish incoming calls over the Basestation Control channel. If the subscriber status is ACTIVE (Step 1600) or all channels are in use (Step 1602), the call is rejected. Otherwise, a CDMA channel is removed from the pool of idle channels (Step 1604) and an incoming call message is sent by the Basestation (Step 1606). At this point the subscriber status is OPERATION IN PROGRESS. Upon receipt of the incoming message (Step 1608), the subscriber posts a confirmation on the earliest available FAST response slot (Step 1610), and posts the message a second time on following slot (Step 1612). The subscriber then switches to the posted channel (Step 1614) and synchronizes to the radio overhead channel (Step 1616). Upon posting of the incoming call message, the Basestation initiates D and Radio Overhead messages on the Traffic channel (Step 1618). Bi-directional D and RO communications are established (Step 1620) and final call set up is completed (Step 1622). At this point, the subscriber status is ACTIVE. If this procedure fails or a time out occurs, the network is sent a busy signal (Step 1624), otherwise, a normal call is completed (Step 1626). When an on-hook situation is detected (Step 1628) at either end, call tear down procedures are initiated (Step 1630) and the subscriber returns to the Basestation Control channel with STANDBY status.

Figure 14:
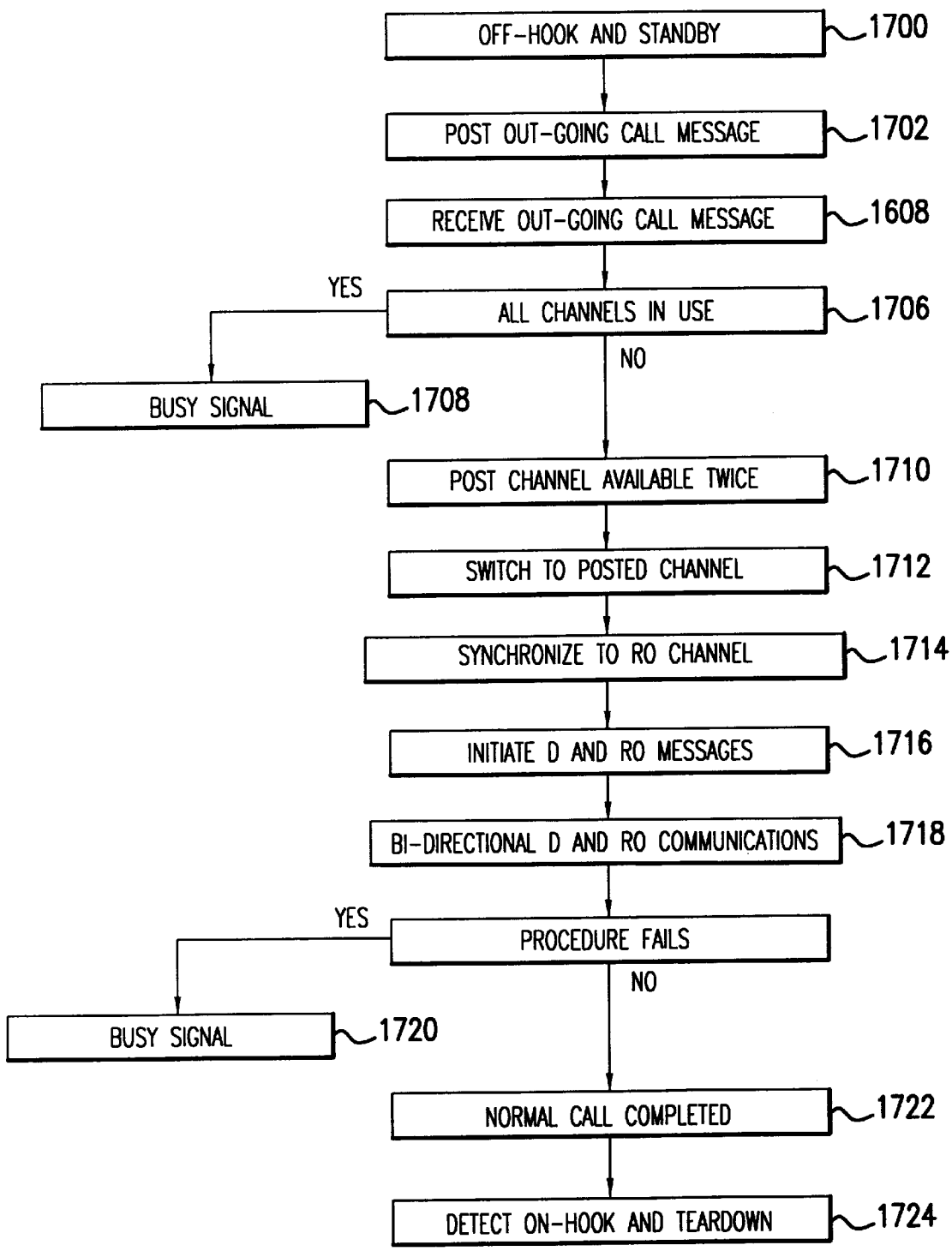
FIG. 14 is a flowchart of the procedure to establish outgoing calls according to the present invention.

The procedure for outgoing calls is quite similar to incoming calls, however, the tight time constraints imposed by the network interface is not required (rapid dial tone in approximately 1 second is a reasonable operations goal). FIG. 14 provides a flowchart for the procedure to establish outgoing calls. Upon detection of the off hook condition and subscriber status is STANDBY (Step 1700), the subscriber posts an outgoing call message (Step 1702) at the next assigned time slot (Note that FAST slots are not used for outgoing calls). Upon receipt of the outgoing call message (Step 1704), the Basestation checks to see if all the traffic channels are being used (Step 1706). If all channels are in use, the basestation posts a busy message and the subscriber applies busy tone (Step 1708). If a channel is available, the base posts a channel available message twice (Step 1710). The subscriber status is then OPERATION IN PROGRESS. The subscriber switches to the posted channel (Step 1712)

and synchronizes to the Radio Overhead channel (Step 1714). Upon the posting of the incoming call message, the Basestation initiates D and Radio Overhead messages on the Traffic channel (Step 1716). Bi-directional D and RO communications are established (Step 1718) and final call set up is completed. At this point, the subscriber status is ACTIVE. If this procedure fails or a time out occurs, the network is sent a busy signal (Step 1720), otherwise, a normal call is completed (Step 1722). When an on-hook situation is detected at either end, call tear down procedures are initiated (Step 1724) and the subscriber returns to the Basestation Control channel with STANDBY status.

While in the STANDBY state, any number of overhead functions are performed. However, the following priority must be observed:

1. Broadcast Control messages to one or more subscribers to cease transmission, to stop and resynchronize, and to set up power and timing (if subscriber transmission power deviates by over +/-¼ chip or +/-1 dB in open loop operations calibration messages are sent).
2. Subscriber to Basestation emergency call override. Digit capture allows automatic call drop of as many traffic channels as are required for emergency service requests
3. Incoming calls from the network. In the case where the subscriber goes of hook in the middle of incoming, call establishment (i.e., glare condition) is pushed through to the subscriber without ring generation.
4. Subscriber to base standard calls.
5. All other operations.

Software download is performed over the basestation control channel by dividing the firmware image into small packets and using positive acknowledgment (ACK) by the subscribers and retransmission of image packets until complete images are available at all subscribers. Each packet and the entire image should be protected by software checksums as well as HDLC formatting.

Virtual LAN Protocol

As has been described above, the virtual LAN of the present invention requires certain provisioning. The customer premise interface must be equipped with a dedicated data port; the basestation must be capable of processing and routing data through a telecommunications network; the user must have an internet service provider that assigns the user with an IP address which the present invention associates with a virtual IP address. With these provisions met, the virtual LAN implements unique protocols to established LAN service. As shown below, the LAN protocol of the present invention is similar to the voice protocols of the present invention.

A service request is first initiated by the subscriber. Note that if a customer is using a business server at the customer premise interface, it has to be active at all times. Once the service request is initiated, the control channel is used for access request as in the voice service. The basestation then provides an access grant where a local logical number is provided for MAC protocol and a CDMA code is also provided. The subscriber then acknowledges the basestations access grant. Upon a failure the sequence is repeated until successful completion or timeout.

In the LAN CDMA channels, service association and authentication protocols are implemented as follows. The basestation requests an association packet. The subscriber station replies with a logic number and IP and subscriber station number. This step is repeated until successful or a timeout is reached. The basestation then authenticates the IP or subscriber station number against a provision table previously established. Upon successful authentication, the basestation grants access. Alternatively, if the user is not provisioned properly, the basestation denies access.

Under normal operations the basestation transmits outbound packets and control information and the subscriber station replies in a token ring manner. The subscriber station transmits fragmented information as detailed previously in this specification. A positive ACK/NACK protocol is applied to all fragments unless the message is a broadcast message. Retransmission of TCP/IP data is as required in the TCP/IP protocol.

In order to improve efficient use of resources it may be necessary to implement timeout and disconnect procedures where the user is disconnected after no data is transmitted for a specified amount of time. Upon such an occurrence a disassociate message is sent so as to reset the stations. Upon further need for data access, the user is reestablished using the protocol just described.

The present invention is designed to meet the timing, electrical, and associated protocols required to support the standardized interfaces of the customer premise equipment as well as the telecommunications networks. Furthermore, the RF spectrum that the present invention uses is highly regulated, scarce and valuable resource. For the most part, operators have to either purchase the spectrum outright or operate in a shared band. In either case, efficient modulation techniques, digital pulse shaping, and proper cell/frequency planning are required to maximize spectral utilization. Concentration is a fundamental requirement of any commercially viable WLL and played a critical roll in the design of the present invention. Future network interfaces (V5.2 and GR-303) provide naturally concentrated interfaces and are within the ambit of the present invention.

It should be appreciated by those skilled in the art that the specific embodiments disclosed above may be readily utilized as a basis for modifying or designing other WLL systems for carrying out the same purposes of the present invention. For example, the coding and modulation scheme may be changed as hardware requirements necessitate. Similarly frame structures may be changed to meet certain specialized needs. It should also be appreciated by those skilled in the art that such equivalent constructions do not depart from the spirit and scope of the invention as set forth in the appended claims.

What is claimed is:

1. In a spread spectrum wireless system, a method for synchronizing a pseudo-noise sequence comprising the steps of:
   determining a range of frequency offsets for a received carrier signal;
   centering the range of frequency offsets about a nominal frequency; determining a frequency step;
   correlating a received signal with a psuedo-noise code at each possible phase shift throughout the centered range of frequency offsets at steps equal to the frequency step; and
   storing the result of the correlations in a memory along with the corresponding frequencies.

2. A method as in claim 1, wherein iterations are completed by starting at a particular frequency and incrementing by the frequency step.

3. A method as in claim 1, wherein iterations are completed by starting at a particular frequency and decrementing by the frequency step.

4. The method as in claim 1, wherein at least two correlations are performed at each iteration and the result is stored in a media along with the corresponding frequencies.

5. The method as in claim 4, wherein a comparison is made of all stored correlations to choose the maximum correlation and the corresponding frequency.

6. The method as in claim 5, wherein the receiver frequency is set to the chosen corresponding frequency.

7. The method as in claim 6, wherein stored phase settings are retrieved to be used in specifying a second range of phase settings.

8. The method as in claim 7, wherein the phase is iterated through a range and correlations are performed and stored in a memory along with the corresponding phase.

9. The method as in claim 8, wherein a comparison is made of all stored correlations to choose the maximum correlation and the corresponding phase.

10. The method as in claim 8, wherein the receiver is tuned to the corresponding phase.

11. A method as in claim 1, wherein the receiver is iteratively set to all predetermined phase settings.

12. A method as in claim 11, wherein iterations are completed by starting at a particular phase and incrementing by a specified phase amount.

13. A method as in claim 11, wherein iterations are completed by starting at a particular phase and decrementing by a specified phase amount.

14. A method as in claim 11, wherein correlations are performed at each iteration and the result is stored in a memory.

15. In a spread spectrum wireless system, a method for aligning a frame comprising the steps of:
receiving a signal at a receiver; and
performing a correlation on the received signal with a composite code over a symbol period and determining if the result of the correlation is above a predetermined threshold to determine whether the portion of the signal is in a receive or transmit mode;
wherein a correlation above the predetermined threshold level means that the frame is currently in a receive mode, otherwise, the frame is in transmit mode.

16. The method as in claim 15, further comprising the step:
after a mode of a frame is determined, either transmit or receive, confirming frame alignment by calculating high correlations for a first number of occurrences and then calculating low correlations for a second number of occurrences.

17. The method as in claim 16, further comprising the step:
after the second number of low correlations is performed, advancing or retarding pseudo noise code timing.

18. A method for synchronizing a subscriber station receiver to a transmitter of a base station in a wireless local loop comprising the steps of:
tuning the receiver to a specified frequency channel;
switching the receiver to a basestation pilot code division multiple access channel;
synchronizing the receiver to the basestation transmittal;
switching the receiver to a basestation control code division multiple access channel; and
waiting for synchronization message.

19. A method as in claim 18, wherein the synchronization step further comprises the step of recovering pseudo-noise.

20. A method as in claim 18, wherein the synchronization step further comprises the step of adjusting frequency error to zero.

21. A method as in claim 18, wherein the synchronization step further comprises the step of resetting oscillators.

22. A method as in claim 18, wherein the synchronization step further comprises the step of aligning the burst frame.

23. A method as in claim 18, wherein the synchronization step further comprises the step of confirming synchronization.

24. A method as in claim 18, wherein the waiting step further comprises the step of confirming frame alignment.

25. A method as in claim 18, wherein the waiting step further comprises the step of waiting for transmitter synchronization.

26. A method for synchronizing a subscriber station transmitter to a receiver of a base station in a wireless local loop comprising the steps of:
receiving a basestation transmitter synchronization message from a basestation on a first code division multiple access channel;
switching the subscriber station transmitter to a second code division multiple access channel;
establishing a link by setting the subscriber transmitter to a coarse time delay received from the basestation in a coarse offset message and sending a message to the basestation on the second code division multiple access channel;
receiving a signal from the basestation to the subscriber that a link has been established; and
signaling by the subscriber to the basestation confirming that the link is established.

27. A method as in claim 26, further comprising the step of timing synchronization.

28. A method as in claim 26, further comprising the step of stopping the attempt to achieve synchronization if time exceeds a predetermined duration.

29. A method as in claim 26, further comprising the step of returning the subscriber to a basestation control channel if synchronization is achieved within a predetermined duration.

30. A method as in claim 26, further comprising the step of adjusting differential phase and power adjustments.

31. A method as in claim 26, further comprising the step of saving the value of the differential phase and power adjustments upon achieving synchronization.

32. A method as in claim 26, after the transmitter is switched to the pilot channel, including the step of aligning to a radio overhead frame.

33. A method as in claim 26, wherein the link establishment step further comprises transmitting a subscriber radio overhead message.

34. A method as in claim 26, wherein the first code division multiple access channel is a basestation control channel and the second code division multiple access channel is a basestation pilot channel.

35. A method for synchronizing a subscriber station transmitter to a receiver of a base station in a wireless local loop comprising the steps of:
transmitting a basestation transmitter synchronization message to the subscriber station on a first code division multiple access channel;
offsetting receive correlators for a second code division multiple access channel by a median time delay;
transmitting a coarse offset message including a coarse time delay to the subscriber station on the second code division multiple access channel;
receiving a message from the subscriber station;
transmitting a signal to the subscriber indicating that a link has been established; and receiving a signal from the subscriber confirming the link is established.

36. A method as in claim 35, wherein the first code division multiple access channel is a basestation control channel and the second code division multiple access channel is a basestation pilot channel.

* * * * *